US012779642B2

(12) United States Patent
Kukucka et al.

(10) Patent No.: US 12,779,642 B2
(45) Date of Patent: *Nov. 3, 2026

(54) FASTENER EXTRACTOR AND DISLODGING TOOL APPARATUS

(71) Applicant: Grip Holdings LLC, Brandon, FL (US)

(72) Inventors: Paul Kukucka, Brandon, FL (US); Thomas Kukucka, Brandon, FL (US)

(73) Assignee: Grip Holdings LLC, Brandon, FL (US)

(*) Notice: Subject to any disclaimer, the term of this patent is extended or adjusted under 35 U.S.C. 154(b) by 306 days.

This patent is subject to a terminal disclaimer.

(21) Appl. No.: 18/409,542

(22) Filed: Jan. 10, 2024

(65) Prior Publication Data

US 2024/0139921 A1 May 2, 2024

Related U.S. Application Data

(63) Continuation-in-part of application No. 17/336,236, filed on Jun. 1, 2021, now Pat. No. 11,897,099, which (Continued)

(51) Int. Cl.
*B25B 27/18* (2006.01)
*B25B 13/06* (2006.01)

(52) U.S. Cl.
CPC ............ *B25B 27/18* (2013.01); *B25B 13/065* (2013.01)

(58) Field of Classification Search
CPC ....... B25B 13/04; B25B 13/06; B25B 13/065; B25B 13/50; B25B 15/004; B25B 15/005; B25B 21/00; B25B 23/0035; B25B 23/0057; B25B 23/02; B25B 27/18; F16B 23/0023; F16B 23/0038; F16B 23/0092
See application file for complete search history.

(56) References Cited

U.S. PATENT DOCUMENTS 1,549,041 A 8/1925 Berg
1,798,944 A 3/1931 Jackman
(Continued)

FOREIGN PATENT DOCUMENTS

AU 201612229 4/2016
AU 201612720 6/2016
(Continued)

*Primary Examiner* — Robert J Scruggs

(57) ABSTRACT

A fastener extractor and dislodging tool apparatus includes a torque-tool body, a threaded opening, a plurality of engagement features, and a release bolt. The plurality of engagement features that grips the lateral surface of the stripped fastener is radially positioned around a rotation axis of the torque-tool body. The plurality of engagement features being perimetrically connected around a base of the torque-tool body thus delineating a socket body that removes the stripped fastener. The threaded opening traverses through the base so that the release bolt can be threadedly engaged with the threaded opening, opposite of the plurality of engagement features. When the stripped fastener is jammed within the plurality of engagement features, the release bolt can be threadedly moved into the space between the plurality of engagement features thus dislodging the stripped fastener from the torque-tool body.

13 Claims, 26 Drawing Sheets

Related U.S. Application Data is a continuation-in-part of application No. 16/514,117, filed on Jul. 17, 2019, now abandoned, which is a continuation-in-part of application No. 16/255,341, filed on Jan. 23, 2019, now Pat. No. 11,154,969.

(60) Provisional application No. 62/733,507, filed on Sep. 19, 2018.

(56) References Cited

U.S. PATENT DOCUMENTS

| | | | |
|---|---|---|---|
| 2,969,250 | A | 1/1961 | Kull |
| 3,405,377 | A | 10/1968 | Pierce |
| 3,495,485 | A | 2/1970 | Knudsen et al. |
| 3,902,384 | A | 9/1975 | Ehrler |
| 3,908,489 | A | 9/1975 | Yamamoto et al. |
| 3,913,427 | A | 10/1975 | Brase |
| 4,074,597 | A | 2/1978 | Jansson |
| 4,361,412 | A | 11/1982 | Stolarczyk |
| 4,536,115 | A | 8/1985 | Helderman |
| 4,598,616 | A | 7/1986 | Colvin |
| 4,607,547 | A | 8/1986 | Martus |
| 4,651,596 | A | 3/1987 | Rachanski |
| 4,893,530 | A | 1/1990 | Warheit |
| 4,927,020 | A | 5/1990 | Randy |
| 4,930,378 | A | 6/1990 | Colvin |
| 5,012,706 | A * | 5/1991 | Wright .................. B25B 13/065 81/121.1 |
| 5,019,080 | A | 5/1991 | Hemer |
| 5,031,487 | A | 7/1991 | Polonsky |
| 5,219,392 | A | 6/1993 | Ruzicka et al. |
| 5,228,570 | A | 7/1993 | Robinson |
| 5,251,521 | A | 10/1993 | Burda et al. |
| 5,295,422 | A * | 3/1994 | Chow .................. B25B 13/461 81/177.85 |
| 5,398,823 | A | 3/1995 | Anders |
| 5,481,948 | A | 1/1996 | Zerkovitz |
| 5,501,342 | A | 3/1996 | Geibel |
| 5,519,929 | A | 5/1996 | Bleckman |
| 5,645,177 | A | 7/1997 | Lin |
| 5,649,791 | A | 7/1997 | Connolly |
| 5,669,516 | A | 9/1997 | Horn |
| 5,725,107 | A | 3/1998 | Dembicks |
| 5,737,981 | A | 4/1998 | Hildebrand |
| 5,743,394 | A | 4/1998 | Martin |
| 5,782,148 | A | 7/1998 | Kerkhoven |
| 5,829,327 | A | 11/1998 | Stanton |
| 5,832,792 | A | 11/1998 | Hsieh |
| 5,868,049 | A | 2/1999 | Kanwal |
| 5,904,076 | A | 5/1999 | Siwy |
| 6,009,778 | A | 1/2000 | Hsieh |
| 6,079,299 | A | 6/2000 | Sundstrom |
| 6,092,279 | A * | 7/2000 | Shoup .................. B25B 27/062 29/259 |
| 6,352,011 | B1 | 3/2002 | Fruhm |
| 6,431,373 | B1 | 8/2002 | Blick |
| 6,575,057 | B1 | 6/2003 | Ploeger |
| 6,626,067 | B1 | 9/2003 | Iwinski |
| 6,698,316 | B1 | 3/2004 | Wright |
| 6,729,208 | B1 | 5/2004 | Chrzanowski |
| 6,755,098 | B2 | 6/2004 | Huang |
| 6,761,089 | B2 | 7/2004 | Bergamo |
| 6,857,340 | B2 | 2/2005 | Wagner |
| 6,951,156 | B2 | 10/2005 | Garg |
| 7,000,501 | B1 | 2/2006 | Chen |
| D524,615 | S | 7/2006 | Albertson |
| 7,137,514 | B1 | 11/2006 | Nickipuck |
| 7,225,710 | B2 * | 6/2007 | Pacheco, Jr. .......... B25B 15/008 81/436 |
| 7,261,020 | B2 * | 8/2007 | Hsieh .................... B25B 13/065 81/186 |
| 7,331,260 | B2 | 2/2008 | Cheng |
| 7,434,494 | B1 | 10/2008 | Snider |
| D614,931 | S | 5/2010 | Su |
| 7,717,278 | B2 | 5/2010 | Kao |
| 7,788,994 | B2 | 9/2010 | Wright et al. |
| 7,814,814 | B2 | 10/2010 | Whitehead |
| 7,841,480 | B2 | 11/2010 | Hsieh |
| 7,913,593 | B2 | 3/2011 | Dahar et al. |
| 8,166,851 | B2 | 5/2012 | Pchola |
| 8,302,255 | B2 | 11/2012 | Lin |
| 8,336,709 | B1 | 12/2012 | Geibel |
| 9,132,533 | B2 | 9/2015 | Lesche et al. |
| D745,814 | S | 12/2015 | Hsieh |
| D776,505 | S | 1/2017 | Doroslovac |
| D784,106 | S | 4/2017 | Doroslovac |
| 9,687,968 | B2 | 6/2017 | Doroslovac et al. |
| D794,405 | S | 8/2017 | Doroslovac et al. |
| 9,718,170 | B2 | 8/2017 | Eggert et al. |
| D798,682 | S | 10/2017 | Doroslovac et al. |
| 9,873,195 | B1 | 1/2018 | Buxton |
| 9,878,441 | B1 | 1/2018 | Kao |
| D829,069 | S | 9/2018 | Doroslovac et al. |
| 10,081,094 | B2 | 9/2018 | Doroslovac et al. |
| 10,328,554 | B2 | 6/2019 | Todd |
| D859,944 | S | 9/2019 | Kukucka et al. |
| D859,945 | S | 9/2019 | Kukucka et al. |
| D859,946 | S | 9/2019 | Kukucka et al. |
| D859,947 | S | 9/2019 | Kukucka et al. |
| D867,841 | S | 11/2019 | Kukucka et al. |
| D868,553 | S | 12/2019 | Kukucka et al. |
| 10,493,519 | B2 | 12/2019 | Ross |
| D879,577 | S | 3/2020 | Kukucka et al. |
| D880,968 | S | 4/2020 | Kukucka et al. |
| D880,977 | S | 4/2020 | Kukucka et al. |
| D885,149 | S | 5/2020 | Kukucka et al. |
| D887,233 | S | 6/2020 | Kukucka et al. |
| D887,711 | S | 6/2020 | Kukucka et al. |
| D889,224 | S | 7/2020 | Kukucka et al. |
| D889,257 | S | 7/2020 | Kukucka et al. |
| D892,578 | S | 8/2020 | Kukucka et al. |
| 10,780,556 | B2 | 9/2020 | Kukucka et al. |
| 10,786,890 | B2 | 9/2020 | Kukucka et al. |
| D899,091 | S | 10/2020 | Kukucka et al. |
| 10,828,766 | B2 | 11/2020 | Kukucka et al. |
| D904,152 | S | 12/2020 | Kukucka et al. |
| D906,781 | S | 1/2021 | Kukucka et al. |
| 10,882,162 | B2 | 1/2021 | Kukucka et al. |
| D909,842 | S | 2/2021 | Kukucka et al. |
| D910,490 | S | 2/2021 | Lim et al. |
| 10,919,133 | B2 | 2/2021 | Kukucka et al. |
| 10,967,488 | B2 | 4/2021 | Kukucka et al. |
| 11,045,925 | B2 | 6/2021 | Kukucka et al. |
| 11,154,969 | B2 | 10/2021 | Kukucka et al. |
| 11,364,602 | B2 | 6/2022 | Kukucka et al. |
| 11,897,099 | B2 * | 2/2024 | Kukucka ................. B25B 27/18 |
| 2003/0209111 | A1 | 11/2003 | Huang |
| 2004/0093996 | A1 * | 5/2004 | Fu ......................... B25B 13/065 81/121.1 |
| 2004/0256263 | A1 | 12/2004 | Shih |
| 2005/0098459 | A1 | 5/2005 | Gorman |
| 2005/0103664 | A1 | 5/2005 | Shih |
| 2005/0183548 | A1 | 8/2005 | Horobec |
| 2005/0194330 | A1 | 9/2005 | Ziske |
| 2005/0257357 | A1 | 11/2005 | Huang |
| 2005/0274233 | A1 | 12/2005 | Lin |
| 2006/0130618 | A1 | 6/2006 | Hsieh |
| 2006/0156869 | A1 | 7/2006 | Hsieh |
| 2006/0266168 | A1 | 11/2006 | Pacheco, Jr. |
| 2007/0005070 | A1 | 1/2007 | Kay et al. |
| 2007/0261519 | A1 | 11/2007 | Cheng |
| 2008/0072717 | A1 | 3/2008 | Stumpf |
| 2008/0235930 | A1 | 10/2008 | English |
| 2009/0007732 | A1 | 1/2009 | Hsieh |
| 2009/0120885 | A1 | 5/2009 | Kao |
| 2009/0220321 | A1 | 9/2009 | Sakamura |
| 2009/0255384 | A1 | 10/2009 | Whitehead |
| 2010/0064863 | A1 | 3/2010 | Kozak |
| 2010/0065520 | A1 | 3/2010 | Hsieh |
| 2011/0056339 | A1 | 3/2011 | Su |
| 2011/0303052 | A1 | 12/2011 | Chen |
| 2012/0060656 | A1 | 3/2012 | Chang |
| 2012/0096992 | A1 | 4/2012 | Huang |
| 2012/0132039 | A1 | 5/2012 | Su |

(56) References Cited

U.S. PATENT DOCUMENTS

| | | | |
|---|---|---|---|
| 2013/0047798 | A1 | 2/2013 | Huang |
| 2013/0195581 | A1 | 8/2013 | Unseld et al. |
| 2013/0213193 | A1 | 8/2013 | Lukes |
| 2013/0263706 | A1 | 10/2013 | Safar |
| 2014/0260832 | A1 | 9/2014 | Hsiao |
| 2014/0311302 | A1 | 10/2014 | Taguchi et al. |
| 2014/0331826 | A1 | 11/2014 | Campbell |
| 2014/0360321 | A1 | 12/2014 | Steinweg et al. |
| 2015/0135910 | A1 | 5/2015 | Eggert et al. |
| 2015/0266169 | A1 | 9/2015 | Campbell, II |
| 2015/0314429 | A1 | 11/2015 | Doroslovac |
| 2015/0321332 | A1 | 11/2015 | Lee |
| 2016/0046008 | A1 | 2/2016 | Thomas |
| 2016/0067853 | A1 | 3/2016 | Neto |
| 2016/0136792 | A1 | 5/2016 | Harp |
| 2016/0223005 | A1 | 8/2016 | Rathmann |
| 2016/0271764 | A1 | 9/2016 | Huang |
| 2016/0339564 | A1 | 11/2016 | Chen |
| 2017/0028538 | A1 | 2/2017 | Lourenco et al. |
| 2017/0246733 | A1 | 8/2017 | Shehab |
| 2017/0252905 | A1 | 9/2017 | Doroslovac |
| 2017/0282337 | A1 | 10/2017 | Johnson et al. |
| 2017/0312839 | A1 | 11/2017 | Moss et al. |
| 2017/0312897 | A1 | 11/2017 | Doroslovac et al. |
| 2018/0001450 | A1 | 1/2018 | Anderson |
| 2018/0003241 | A1 | 1/2018 | Goss |
| 2018/0141192 | A1 | 5/2018 | Chang |
| 2018/0354022 | A1 | 12/2018 | Ross et al. |
| 2018/0354102 | A1 | 12/2018 | Kukucka et al. |
| 2019/0001469 | A1 | 1/2019 | Cho et al. |
| 2019/0015961 | A1 | 1/2019 | Kukucka et al. |
| 2019/0152033 | A1 | 5/2019 | Kukucka et al. |
| 2019/0217449 | A1 | 7/2019 | Lee |
| 2019/0283233 | A1 | 9/2019 | Kukucka et al. |
| 2019/0337131 | A1 | 11/2019 | Kukucka et al. |
| 2019/0375077 | A1 | 12/2019 | Kukucka et al. |
| 2020/0070321 | A1 | 3/2020 | Schulz |
| 2020/0078908 | A1 | 3/2020 | Wu et al. |
| 2020/0269398 | A1 | 8/2020 | Donovan |
| 2020/0298380 | A1 | 9/2020 | Doroslovac et al. |
| 2020/0376648 | A1 | 12/2020 | Kukucka et al. |
| 2020/0391360 | A1 | 12/2020 | Kukucka et al. |
| 2021/0039245 | A1 | 2/2021 | Kukucka et al. |
| 2021/0148395 | A1 | 5/2021 | Kukucka et al. |
| 2022/0281085 | A1 | 9/2022 | Kukucka et al. |

FOREIGN PATENT DOCUMENTS

| | | | |
|---|---|---|---|
| AU | 201612721 | | 6/2016 |
| CA | 2564093 | A1 | 4/2007 |
| CA | 168071 | | 12/2016 |
| CA | 2898480 | A1 | 7/2017 |
| CN | 2767068 | Y | 3/2006 |
| CN | 3630254 | | 6/2006 |
| CN | 201046555 | Y | 4/2008 |
| CN | 101208181 | A | 6/2008 |
| CN | 101973013 | | 2/2011 |
| CN | 102395447 | | 3/2012 |
| CN | 102554833 | A | 7/2012 |
| CN | 203197845 | | 9/2013 |
| CN | 103639950 | A | 3/2014 |
| CN | 303924849 | | 11/2016 |
| CN | 303956827 | | 12/2016 |
| CN | 303984883 | | 12/2016 |
| CN | 207548606 | U | 6/2018 |
| CN | 207824800 | | 9/2018 |
| DE | 3911409 | A1 | 10/1990 |
| DE | 9403220 | U1 | 4/1994 |
| DE | 4321325 | A1 | 1/1995 |
| DE | 29613327 | U1 | 9/1996 |
| DE | 10321284 | A1 | 12/2004 |
| DE | 202010006146 | U1 | 7/2010 |
| DE | 202012103034 | | 11/2012 |
| DE | 102012104298 | A1 | 11/2013 |
| DE | 102013021238 | A1 | 6/2015 |
| EP | 0930132 | A2 | 7/1999 |
| EP | 0930132 | A3 | 11/2000 |
| EP | 1371453 | A2 | 12/2003 |
| EP | 1731774 | A1 | 12/2006 |
| EP | 0930132 | B1 | 4/2007 |
| EP | 2363245 | A2 | 9/2011 |
| EP | 2363245 | A3 | 7/2015 |
| GB | 906839 | A | 9/1962 |
| GB | 1294764 | A | 11/1972 |
| GB | 2366532 | A | 3/2002 |
| JP | 2011143522 | | 7/2011 |
| JP | 2012157913 | | 10/2011 |
| JP | 2015180835 | A | 7/2017 |
| KR | 200149097 | Y1 | 7/1999 |
| RU | 2152870 | C1 | 7/2000 |
| RU | 2225786 | C2 | 1/2001 |
| RU | 45671 | U1 | 5/2005 |
| RU | 58510 | U1 | 11/2006 |
| RU | 2387533 | C1 | 4/2010 |
| RU | 116398 | | 5/2012 |
| RU | 180548 | U1 | 6/2018 |
| SU | 16616 | A1 | 8/1930 |
| TW | M442238 | U | 12/2012 |
| TW | 201341127 | A | 10/2013 |
| TW | 201617181 | A | 5/2016 |
| WO | 1994016862 | A1 | 8/1994 |
| WO | 1996010932 | A1 | 4/1996 |
| WO | 1996026870 | A1 | 9/1996 |
| WO | 1996027745 | A1 | 9/1996 |
| WO | 1997010926 | A1 | 3/1997 |
| WO | 1998012982 | A1 | 4/1998 |
| WO | 999032264 | | 7/1999 |
| WO | 1999032264 | A1 | 7/1999 |
| WO | 2001066312 | A1 | 9/2001 |
| WO | 2004002687 | A1 | 1/2004 |
| WO | 2005070621 | | 8/2005 |
| WO | 2006023374 | | 3/2006 |
| WO | 2006130490 | A1 | 12/2006 |
| WO | 2010007402 | A1 | 1/2010 |
| WO | 2011109040 | A1 | 9/2011 |
| WO | 2013028875 | A1 | 2/2013 |
| WO | 2014099954 | | 6/2014 |
| WO | 2015082283 | A1 | 6/2015 |
| WO | 2015050942 | A1 | 9/2015 |
| WO | 2016051080 | A1 | 4/2016 |
| WO | DM/090809 | | 4/2016 |
| WO | DM/091188 | | 5/2016 |
| WO | DM/091189 | | 5/2016 |
| WO | 2016174615 | A1 | 11/2016 |
| WO | WO2017069953 | A1 | 4/2017 |
| WO | 2017178997 | | 10/2017 |
| WO | 2017187388 | A1 | 11/2017 |
| WO | 2018150360 | | 8/2018 |
| WO | 2018150360 | A1 | 8/2018 |
| WO | 2018172831 | | 9/2018 |
| WO | 2019012486 | | 1/2019 |
| WO | 2019167032 | | 9/2019 |
| WO | 2019175652 | | 9/2019 |
| WO | 2020039281 | | 2/2020 |
| WO | 2020039285 | | 2/2020 |
| WO | 2020058777 | | 3/2020 |
| WO | 2020152516 | | 7/2020 |
| WO | 2020208608 | | 10/2020 |
| WO | 2020225800 | | 11/2020 |
| WO | 2021001696 | | 1/2021 |
| WO | 2021019500 | | 2/2021 |
| WO | 2021033152 | | 2/2021 |
| WO | 2022047236 | A1 | 3/2022 |
| WO | 2022103566 | | 5/2022 |
| WO | 2023230168 | | 11/2023 |

* cited by examiner

FASTENER EXTRACTOR AND DISLODGING TOOL APPARATUS

FIELD OF THE INVENTION

The present invention generally relates to various tools designed for extracting or removing fasteners, in particular bolts and nuts. More specifically, the present invention discloses a combination of anti-slip threaded extractors that are designed to remove a damaged fastener and a dislodging tool to remove the damaged fastener from the combination of anti-slip threaded extractors.

BACKGROUND OF THE INVENTION

Hex bolts, nuts, screws, and other similar threaded devices are used to secure and hold multiple components together by being engaged to a complimentary thread, known as a female thread. The general structure of these types of fasteners is a cylindrical shaft with an external thread and a head at one end of the shaft. The external thread engages a complimentary female thread tapped into a hole or a nut and secures the fastener in place, fastening the associated components together. The head receives an external torque force and is the means by which the fastener is turned, or driven, into the female threading. The head is shaped specifically to allow an external tool like a wrench to apply a torque to the fastener in order to rotate the fastener and engage the complimentary female threading to a certain degree. This type of fastener is simple, extremely effective, cheap, and highly popular in modern construction. One of the most common problems in using these types of fasteners, whether male or female, is the tool slipping in the head portion, or slipping on the head portion. This is generally caused by either a worn fastener or tool, corrosion, overtightening, or damage to the head portion of the fastener. Various methods may be used to remove a fastener, some more aggressive than others. Once a fastener head is damaged, a more aggressive method must be implemented to remove a seized fastener. Drilling out the fastener is a common method used by some users to dislodge the fastener. While this method can prove to be effective in some scenarios there is a high risk of damaging the internal threads of the hole.

The present invention is a fastener extractor and dislodging tool apparatus that virtually eliminates the chance of slippage. The present invention uses a series of integrated splines that bite into the head of the fastener and allow for efficient torque transfer between the extractor bit and the head portion of the fastener. The present invention also overcomes another common issue of the traditional bolt extractors, which is material from the fastener heat or the actual fastener being attached or stuck to the extractor tool. More specifically, the present invention allows users to easily dislodge any remaining material and/or the removed fastener from the extracting tool through a dislodging tool.

DETAIL DESCRIPTIONS OF THE INVENTION

All illustrations of the drawings are for the purpose of describing selected versions of the present invention and are not intended to limit the scope of the present invention.

The present invention is generally related to extracting tools and extracting tool accessories. More specifically the present invention discloses a fastener extractor and dislodging tool apparatus that can easily remove a damaged/stripped fastener 53. Once the damaged/stripped fastener 53 is removed through the extracting tool, dislodging of the damaged/stripped fastener 53 from the extractor tool can prove to be a difficult task. The present invention aims to solve this issue by disclosing a release tool that is selectively engaged into the extractor tool. The release tool is specifically designed to assist users with removing any pieces of damaged/stripped fasteners which may have been wedged onto the extractor tool. Furthermore, the present invention is compatible with male-member based head designs of fasteners. Fasteners which utilize a male-member head design, also known as male fasteners, use the external lateral surface of the fastener head to engage a tool for tightening or loosening, such fasteners include hex bolts and nuts. The present invention is further useful on internal driven fasteners also known as socket cap screws that utilize an external socket head design. An example of a male fastener is a bolt with a hex shaped head. In addition, the present invention is compatible with male fasteners of a right-hand thread and male fasteners of a left-hand thread. In addition, the present invention is compatible with any types of male threaded shafts. Even though the present invention is described as a female embodiment, the present invention may be a male embodiment using the same elements or components and incorporating the same functions described herein in a opposite or reversed male embodiment.

Figure 1:
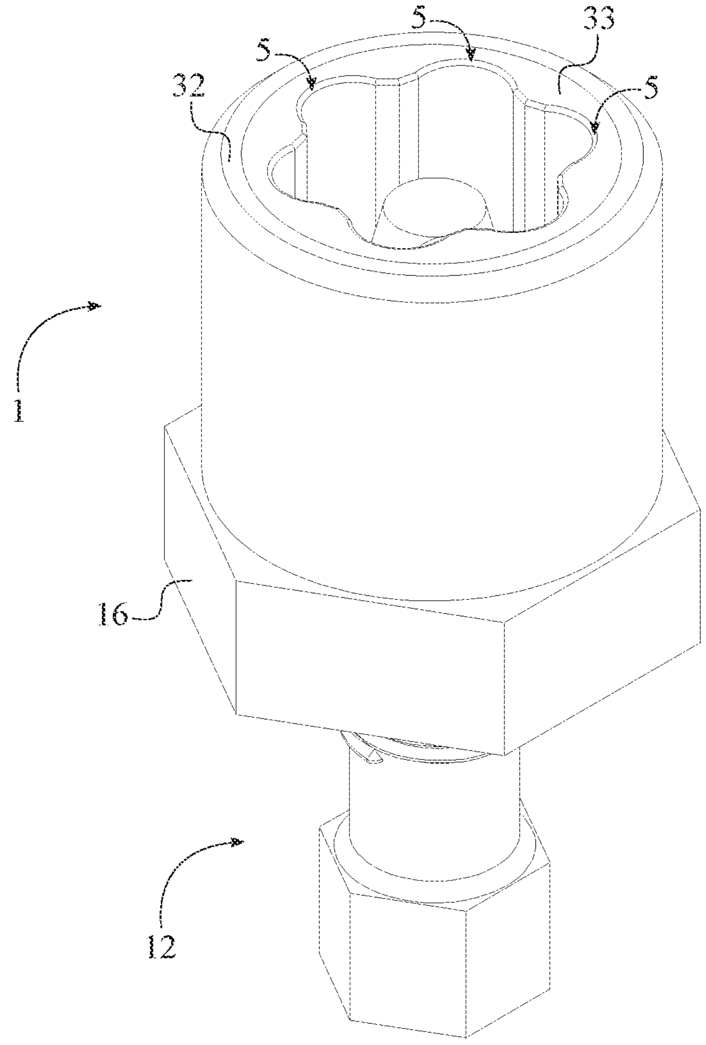
FIG. 1 is a perspective view of the present invention, showing the torque-tool body, the plurality of engagement features, and the release bolt.
Figure 3:
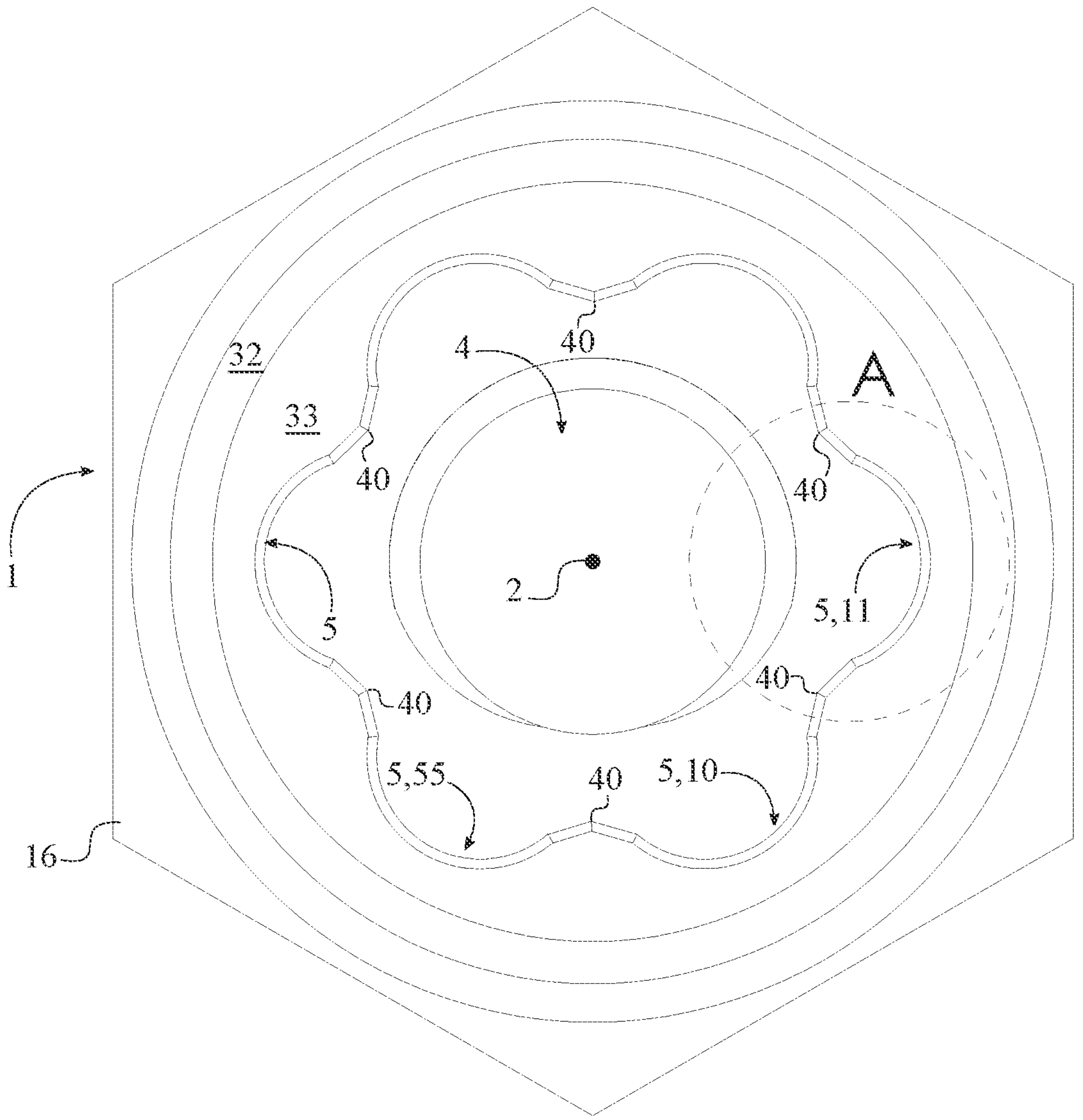
FIG. 3 is a top view of the torque-tool body and the plurality of engagement features of the present invention, showing the section that a detailed view is taken shown in FIG. 4.
Figure 4:
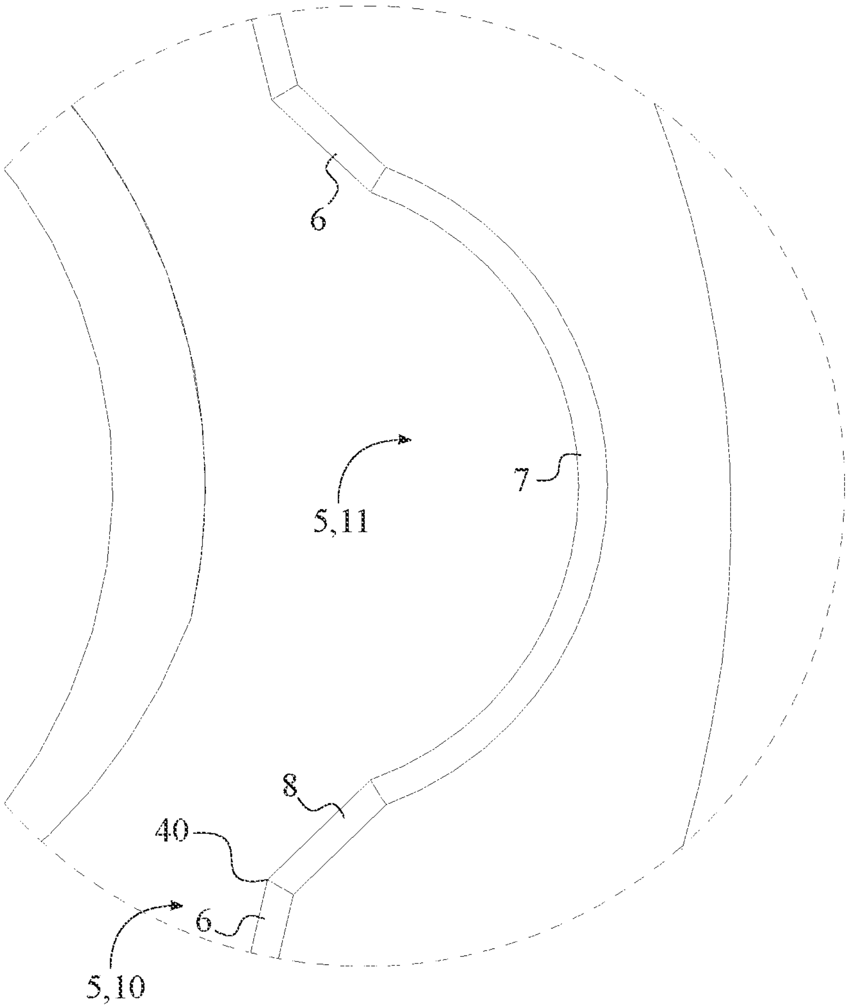
FIG. 4 is a detailed view for the plurality of engagement features of the present invention taken within section line A.
Figure 8:
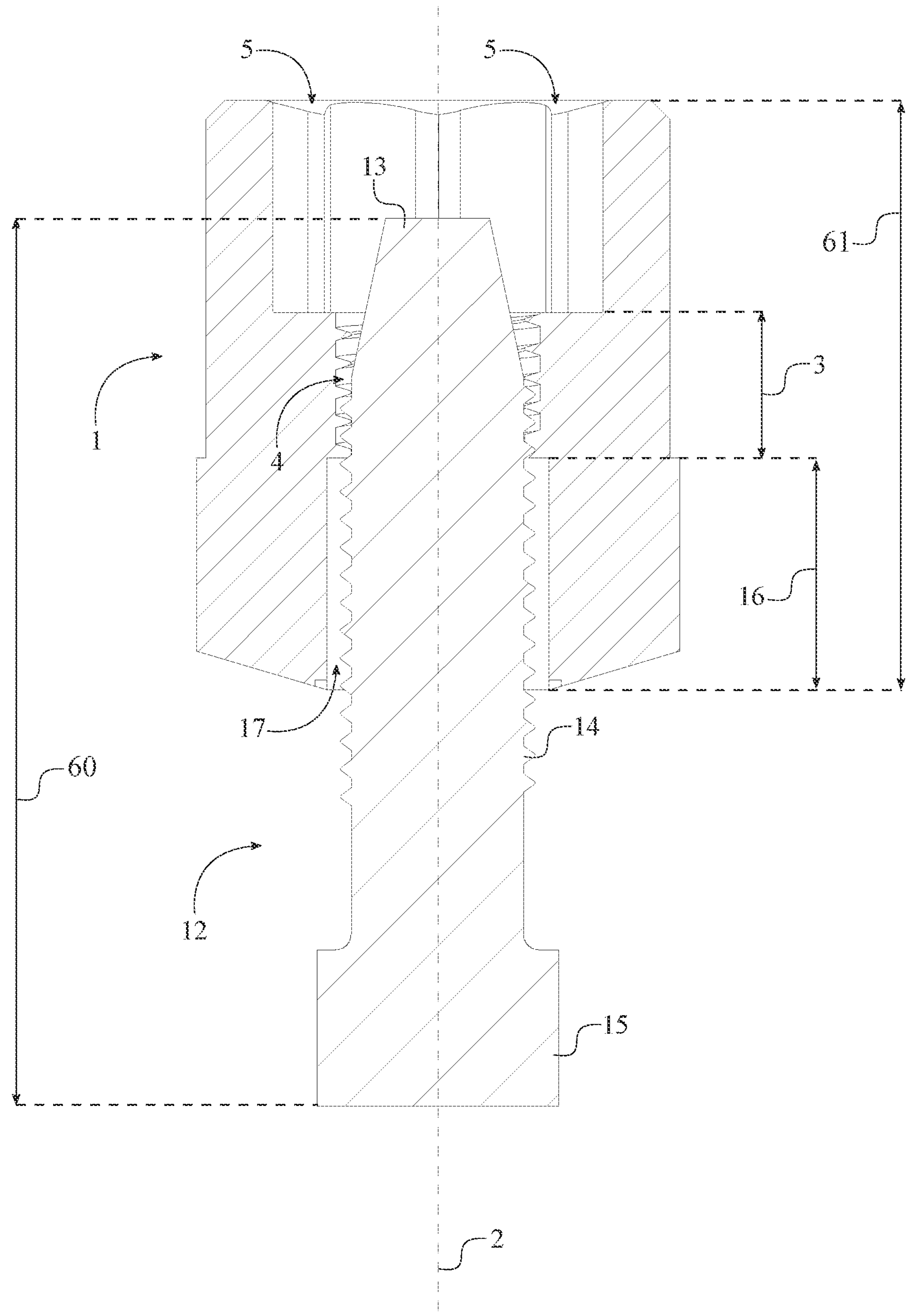
FIG. 8 is a cross sectional view of the torque-tool body, the plurality of engagement features, and the release bolt of the present invention.

Referring to FIG. 1 and FIG. 8, the present invention comprises a torque-tool body 1, a threaded opening 4, a plurality of engagement features 5, and a release bolt 12. The torque-tool body 1 is used as the physical structure to apply the corresponding force by the plurality of engagement features 5 on the fastener head or the threaded shaft. For a male fastener, the torque-tool body 1 is a tubular extrusion sized to fit over the fastener head or the threaded shaft in an interlocking manner, similar to a wrench socket. The length, width, and diameter of the torque-tool body 1 may vary to fit different sized the fastener head or the threaded shaft. The plurality of engagement features 5 prevents slippage during fastener extraction and is radially positioned around a rotational axis 2 of the torque-tool body 1 as seen in FIG. 3. More specifically, the plurality of engagement features 5 is perimetrically connected around a base 3 of the torque-tool body 1 to grip the fastener head or the threaded shaft. As a result, the plurality of engagement features 5 facilitates the transfer of torque to the fastener head or the threaded shaft by preventing slippage from the torque-tool body 1. Furthermore, the plurality of engagement features 5 is equally spaced about the torque-tool body 1 to create an enclosed profile as seen in FIG. 3-4. The threaded opening 4 concentrically traverses through the base 3 and functions as an attachment feature for the release bolt 12. More specifically, the release bolt 12 is threadedly engaged with the threaded opening 4 and positioned opposite of the plurality of engagement features 5. As a result, when the damaged/stripped fastener 53 is jammed within the plurality of engagement features 5 after removal process, the release bolt 12 is able to push out or dislodge the damaged/stripped fastener 53 from the plurality of engagement features 5.

Figure 2:
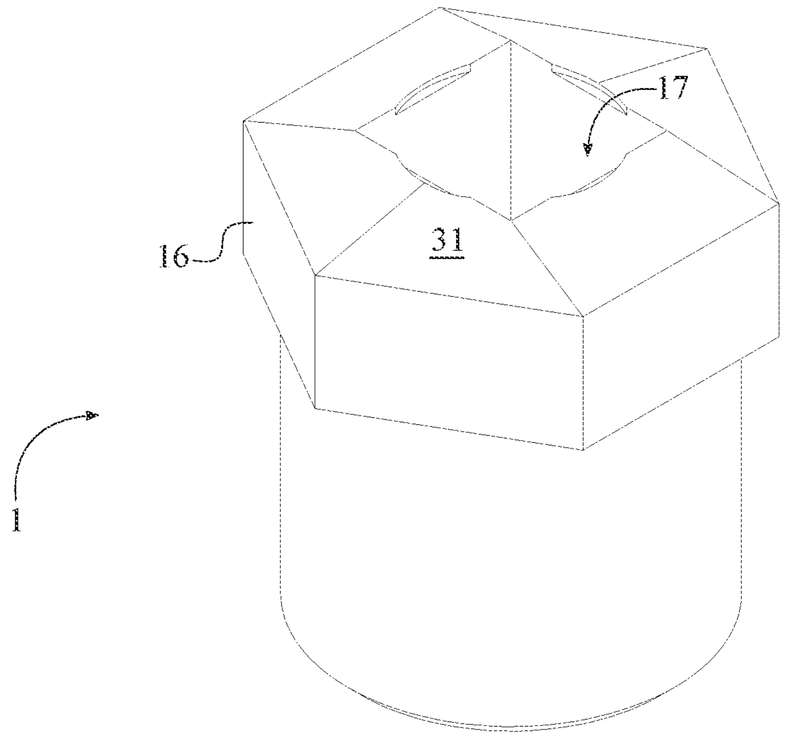
FIG. 2 is a perspective view of the torque-tool body and the bottom surface of the attachment body of the present invention.

In reference to FIG. 1-3, the torque-tool body 1 is outwardly extended from a cross section of the plurality of engagement features 5. This yields a socket-like structure with the plurality of engagement features 5 being distributed about the rotational axis 2 on the internal surface of the torque-tool body 1, similar to a wrench socket. Additionally, a wrench handle can be externally and laterally connected to the torque-tool body 1 thus yielding a wrench handle attachment. With respect to both the wrench socket and the wrench handle attachment, each of the plurality of engagement features 5 is extended along a specific length of the torque-tool body 1 thus delineating an empty space within the torque-tool body 1. The aforementioned empty space functions as a receptive cavity for the fastener head or the threaded shaft so that the plurality of engagement features 5 can grip the fastener head or the threaded shaft.

A traditional socket wrench design transfers the majority of the torque to the male fastener through the lateral corners (intersection point of two lateral walls) of the fastener head. Over time, the degradation of the lateral corners reduces the efficiency of transferring torque from the socket wrench to the fastener head thus causing slippage. The present invention overcomes this problem by moving the torque transfer point to the lateral walls of the fastener head. This is accomplished through the use of the plurality of engagement features 5. Each of the plurality of engagement features 5 is positioned to engage or "bite" the lateral walls of the fastener head instead of the lateral corner. This ensures an adequate amount of torque is transferred to the fastener head to initiate rotation and, resultantly, extraction of the damaged/stripped fastener 53. When the present invention is utilized to remove the threaded shaft, the plurality of engagement features 5 is positioned to engage or "bite" the lateral thread to initiate rotation and, resultantly, extraction of the damaged/stripped fastener 53. Because the present invention is able to virtually eliminate tool slippage off fasteners, one of the improvements and benefits of the present invention over compared to traditional extracting tools is that the present invention is able to improve the life expectancy of both the tools and fasteners. This feature is both a cost saving, time saving as well as a safety benefit.

In reference to FIG. 3-4 that illustrates a preferred embodiment of the present invention, a cross section for each of the plurality of engagement features 5 comprises a first slanted section 6, a hollow section 7, and a second slanted section 8. More specifically, the first slanted section 6 is terminally connected to the hollow section 7. The second slanted section 8 is terminally connected to the hollow section 7, wherein the first slanted section 6 and the second slanted section 8 are oppositely positioned of each other about the hollow section 7. The length of the first slanted section 6, the hollow section 7, and the second slanted section 8 may change. Similarly, corresponding angles between the first slanted section 6, the hollow section 7, the second slanted section 8 may vary to create a sharper tooth-like shape. The first slanted section 6 and the second slanted section 8 are preferably a planar surface but may incorporate a variety of shapes including concave surfaces, plurality of angled surfaces, straight surfaces, convex surfaces, or combination aforesaid surfaces.

In reference to the preferred embodiment of the present invention, a gripping edge 40 is delineated in between a pair of engagement features 5 so that the gripping edge 40 is able to cut "bite" into the fastener head or the threaded shaft during the removal of the damaged/stripped fastener 53. More specifically, the plurality of engagement features 5 comprises an arbitrary engagement feature 10, an adjacent engagement feature 11, and an opposite engagement feature 55 as shown in FIG. 3-4. The arbitrary engagement feature 10 is any feature within the plurality of engagement features 5 in such a way that the adjacent engagement feature 11 is the feature directly next to the arbitrary engagement feature 10. The opposite engagement feature 55 is positioned directly next to the arbitrary engagement feature 10 but positioned opposite of the adjacent engagement feature 11 across the arbitrary engagement feature 10. Furthermore, the first slanted section 6 of the arbitrary engagement feature 10 is connected to the second slanted section 8 of the adjacent engagement feature 11 at the gripping edge 40. The second slanted section 8 of the adjacent engagement feature 11 is angularly offset from the first slanted section 6 of the opposite engagement feature 55. In order to delineate the enclosed profile of the plurality of engagement features 5 about the gripping edge 40, the first slanted section 6 of the arbitrary engagement feature 10 is connected to the second slanted section 8 of the adjacent engagement feature 11 at an obtuse angle.

Furthermore, when the present invention engages with the fastener or the threaded shaft, only the gripping edge 40, the first slanted sections 6, and the second slanted section 8 are in contact with the fastener surface. The hollow section 7 does not engage with the fastener surface thus delineating an empty or hollow space. In other words, the hollow section 7 is delineated into the empty space as the empty space is configured to be positioned offset from the fastener. Further, the shape of the empty space is preferably a curved or radius shape, but the shape of the empty space may be any shape or shapes as preferred by the user.

Figure 6:
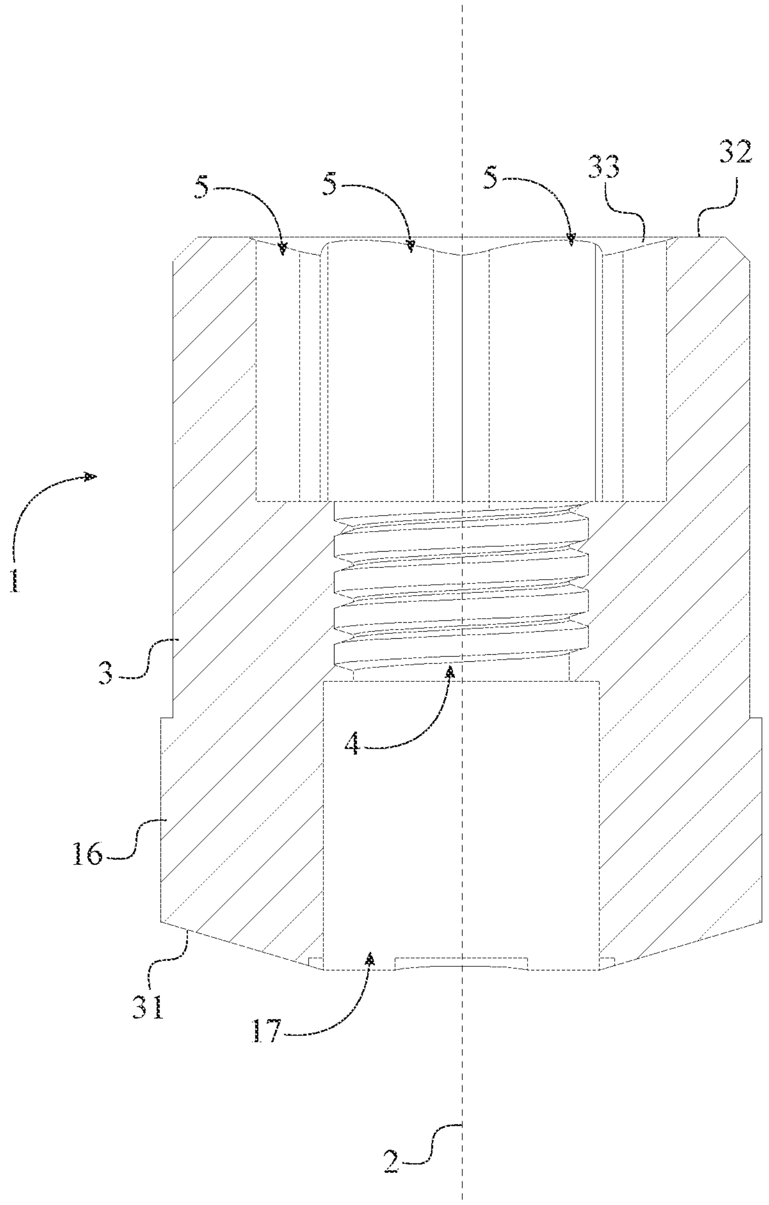
FIG. 6 is a cross section view of the torque-tool body of the present invention taken along line A-A of FIG. 5, showing the terminally connected attachment body and the engagement bore.

In reference to FIG. 3 and FIG. 6, the present invention further comprises a top flat surface 32 and a top chamfered surface 33. The top flat surface 32 of the torque-tool body 1 is positioned adjacent to an outer surface of the plurality of engagement features 5. Furthermore, a transition edge between the top flat surface 32 and the outer surface of the plurality of engagement features 5 is preferably either a chamfered edge or a curved edge but may be a square edge if preferred. The top flat surface 32 and the top chamfered surface 33 are radially delineated by the plurality of engagement features 5, wherein the top flat surface 32 is perimetrically connected around the top chamfered surface 33. Furthermore, the top flat surface 32 is positioned parallel to a top surface 35 of the base 3. The top chamfered surface 33 is angularly positioned to the top flat surface 32 as the top chamfered surface 33 is oriented towards the top surface 35 of the base 3.

Figure 26:
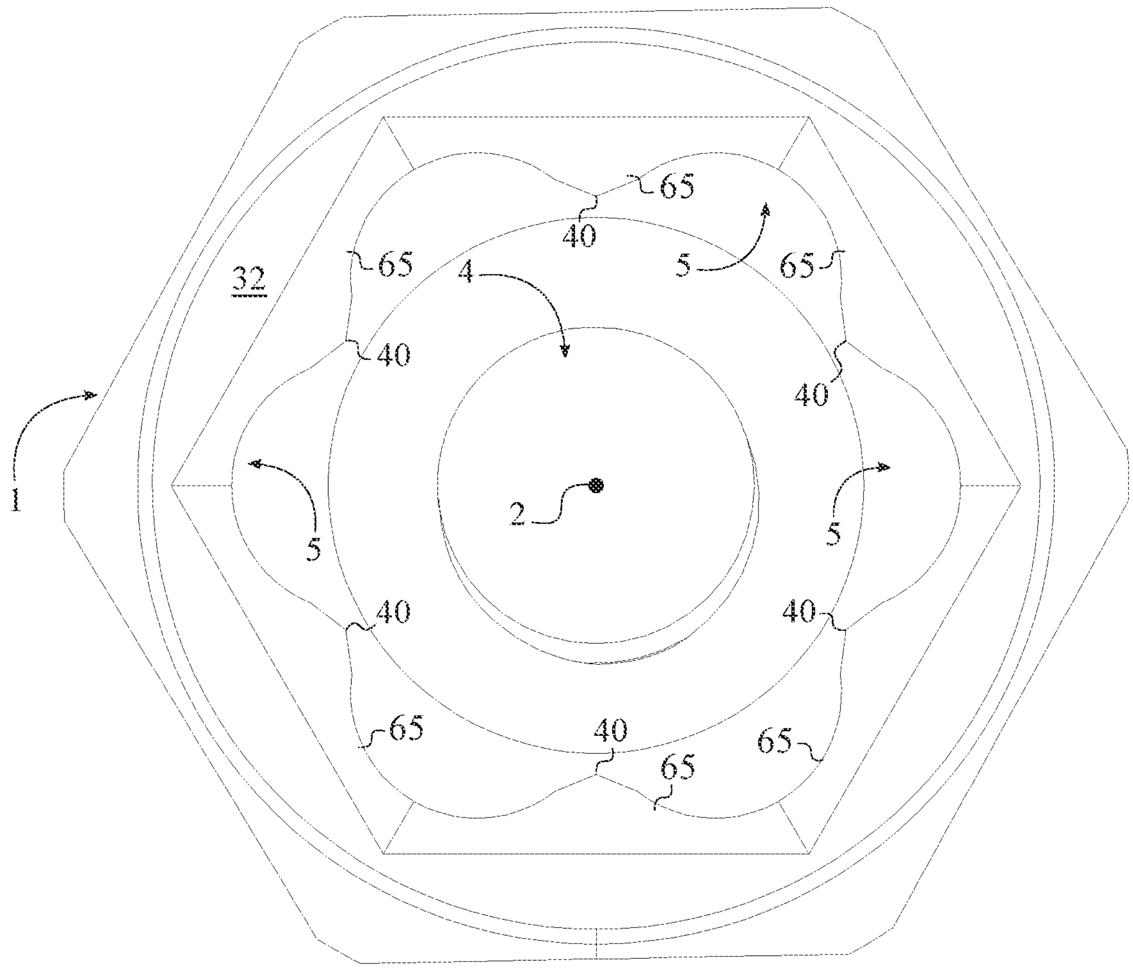
FIG. 26 is a top view of the torque-tool body and the plurality of engagement features of the present invention, showing the top chamfered surface and the six angular portions.

In reference to some embodiments of the present invention, as shown in FIG. 26, the top chamfered surface 33 comprises a plurality of angular portions 65. The plurality of angular portions 65 is radially positioned within the top flat surface 32 and oriented towards the top surface 35 of the base 3. Furthermore, each of the plurality of angular portions 65 is centrally positioned to the gripping edge 40 so that each of the plurality of engagement features 5 is able to efficiently engage with the fastener 53. More specifically, the top chamfered surface 33 preferably comprises six angular portions 65. The six angular portions 65 of the top chamfered surface 33 can also be formed into a hexagonal shape. This indexing chamfer greatly benefits the end user when placing the torque-tool body 1 on a hexagonal fastener to locate the corners of the hexagonal fastener with the correct location on the six angular portions 65 of the top chamfered surface 33 of the torque-tool body 1, and thus placing each of the plurality of engagement features 5 in the correct location on the fastener 53 to achieve the most efficient engagement.

As mentioned above, the present invention may be designed to fit a variety of fastener head designs. This is achieved by varying the number of the plurality of engagement features 5 that complements different types of fastener head designs. The number of the plurality of engagement features 5 generally corresponds to the number of lateral walls of the fastener head. For example, a pentagon shaped fastener head has five lateral walls. In order to remove the male fastener with the pentagon shaped head, a user has to utilize an embodiment of the present invention wherein number of the plurality of engagement features 5 is five engagement features. Preferably, the number of the plurality of engagement features 5 in contact with the fastener head can be eighteen, twelve, six, or four.

Figure 9:
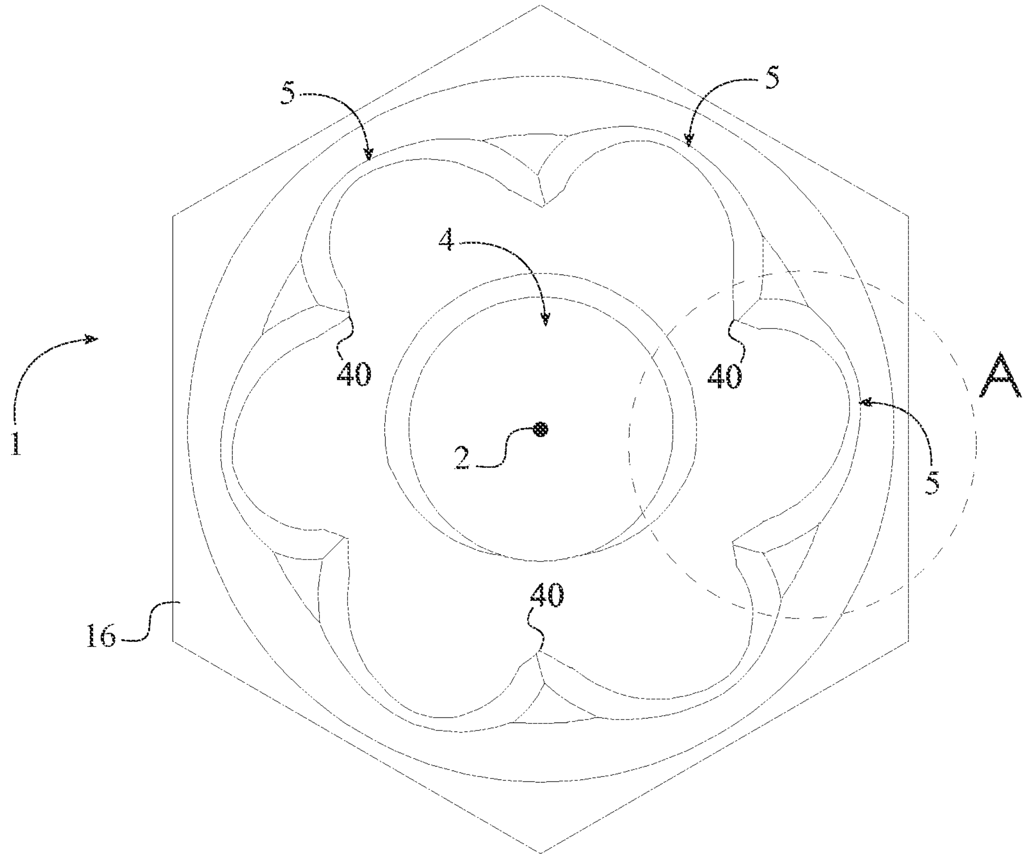
FIG. 9 is a top view of the torque-tool body and the plurality of engagement features of the first alternative embodiment of the present invention, showing the section that a detailed view is taken shown in FIG. 10.
Figure 10:
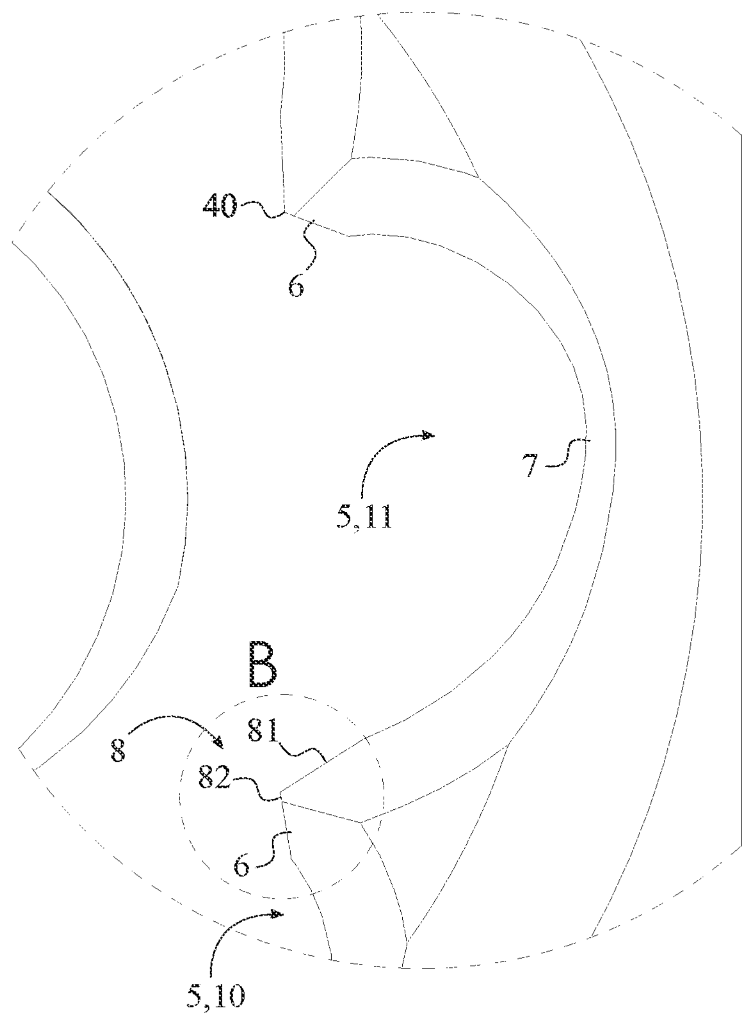
FIG. 10 is a detailed view for the plurality of engagement features of the first alternative embodiment of the present invention taken within section line A and showing the section that a detailed view is taken shown in FIG. 11.
Figure 11:
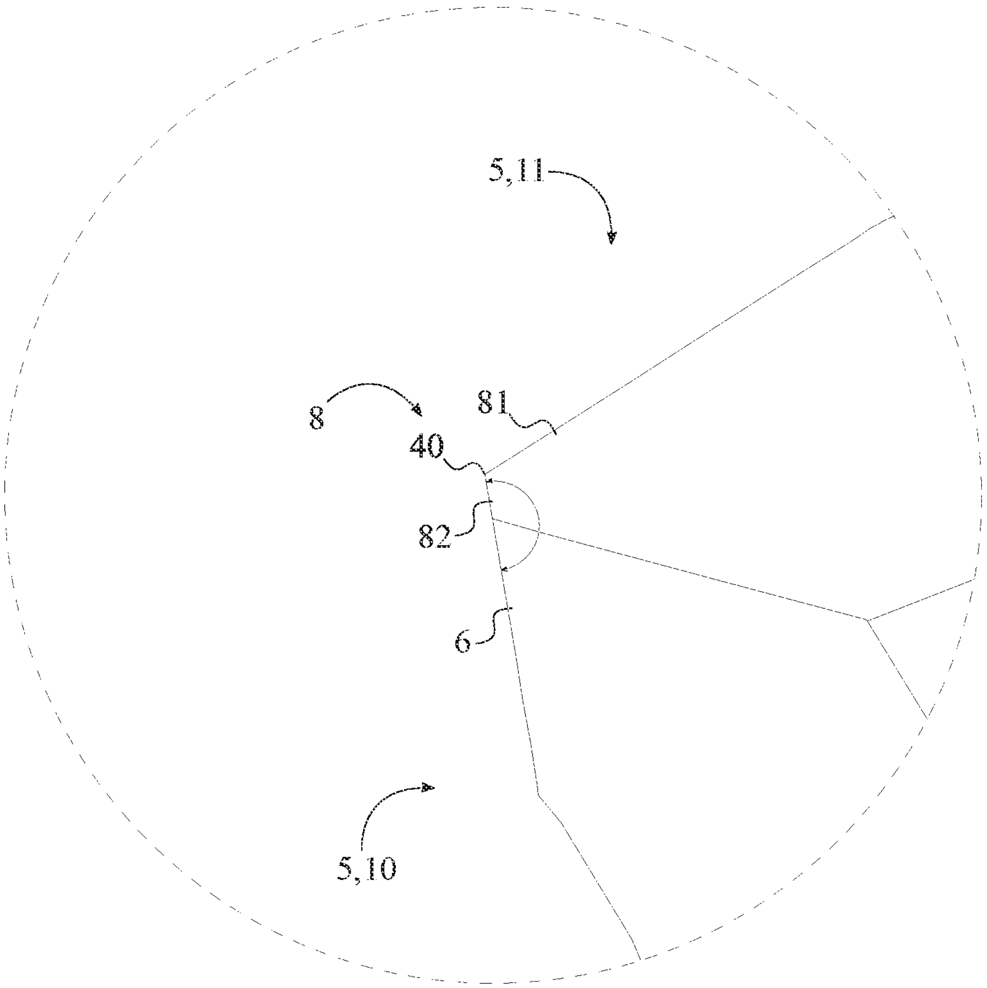
FIG. 11 is a detailed view for the plurality of engagement features of the first alternative embodiment of the present invention taken within section line B.

In reference to FIG. 9-11 that illustrates a first alternative embodiment of the present invention, a cross section for each of the plurality of engagement features 5 comprises the first slanted section 6, the hollow section 7, and the second slanted section 8. The second slanted section 8 further comprises a proximal section 81 and a distal section 82. More specifically, the first slanted section 6 is terminally connected to the hollow section 7. The proximal section 81 of the second slanted section 8 is terminally connected to the hollow section 7, wherein the first slanted section 6 and the proximal section 81 of the second slanted section 8 are oppositely positioned of each other about the hollow section 7. The distal section 82 of the second slanted section 8 is terminally connected to the proximal section 81 of the second slanted section 8 and positioned opposite of the hollow section 7. The length of the first slanted section 6, the hollow section 7, and the second slanted section 8 may change. Similarly, corresponding angles between the first slanted section 6, the hollow section 7, and the second slanted section 8 may vary to create a sharper tooth-like shape.

In reference to the first alternative embodiment of the present invention, the gripping edge 40 is delineated in between the proximal section 81 of second slanted section 8 and the distal section 82 of the second slanted section 8 so that the gripping edge 40 is able to cut into the fastener head or the threaded shaft during the removal of the damaged/stripped fastener 53. More specifically, the plurality of engagement features 5 comprises the arbitrary engagement feature 10 and the adjacent engagement feature 11. The arbitrary engagement feature 10 is any feature within the plurality of engagement features 5 in such a way that the adjacent engagement feature 11 is the feature directly next to the arbitrary engagement feature 10. In reference to FIG. 10-11, the first slanted section 6 of the arbitrary engagement feature 10 is connected to the distal section 82 of the adjacent engagement feature 11 at a straight angle. The distal section 82 of the adjacent engagement feature 11 and the proximal section 81 of the adjacent engagement feature 11 are adjacently positioned with each other with an obtuse angle. Furthermore, the proximal section 81 of second slanted section 8 and the distal section 82 of the second slanted section 8 are oriented at an obtuse angle thus delineating the gripping edge 40.

Figure 12:
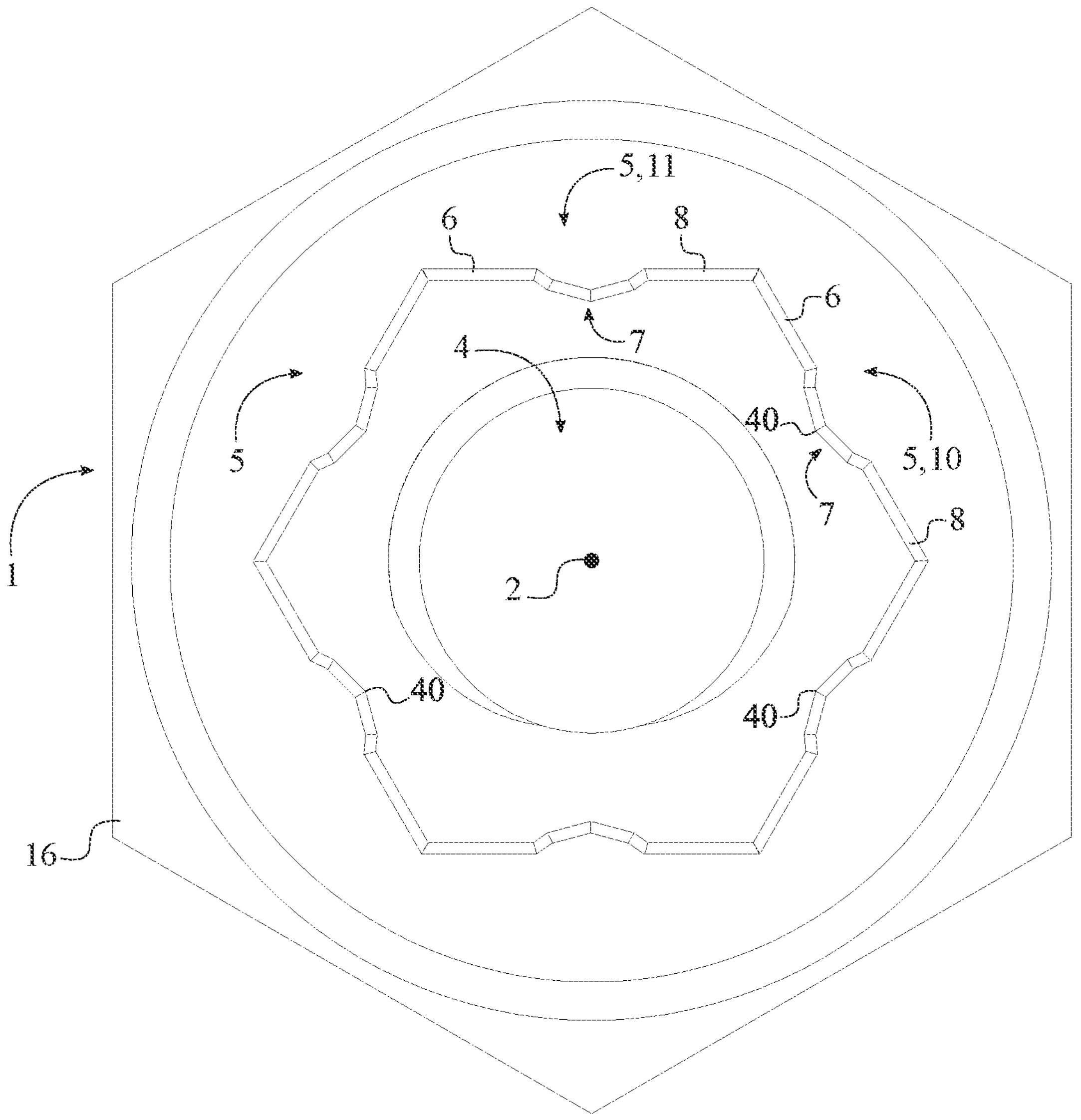
FIG. 12 is a top view of the torque-tool body and the plurality of engagement features of the second alternative embodiment of the present invention.

In reference to FIG. 12 that illustrates a second alternative embodiment of the present invention, a cross section for each of the plurality of engagement features 5 comprises the first slanted section 6, the hollow section 7, and the second slanted section 8. The hollow section 7 further comprises a first section, a second section, a third section, and a fourth section. More specifically, the first section is adjacently connected to the second section. The third section is adjacently connected to the second section and positioned opposite of the first section. The fourth section is adjacently connected to the third section and positioned opposite of the second section. Resultantly, the first slanted section 6 is terminally connected to the first section. The second slanted section 8 is terminally connected to the fourth section, wherein the first slanted section 6 and the second slanted section 8 are oppositely positioned of each other about the hollow section 7. Furthermore, the first slanted section 6 and the second slanted section 8 are linearly positioned with each other as the hollow section 7 oriented towards the rotational axis 2.

In reference to the first alternative embodiment of the present invention, the gripping edge 40 is delineated within the hollow section 7 so that the gripping edge 40 is able to cut into the fastener head during the removal of the damaged/stripped fastener 53. Furthermore, a first section, a second section, a third section, and a fourth section can be shaped into a plurality of straight sections, a plurality of curved section, or a combination of both the straight and curved sections. More specifically, the plurality of engagement features 5 comprises the arbitrary engagement feature 10 and the adjacent engagement feature 11. The arbitrary engagement feature 10 is any feature within the plurality of engagement features 5 in such a way that the adjacent engagement feature 11 is the feature directly next to the arbitrary engagement feature 10. In reference to FIG. 12, first slanted section 6 of the arbitrary engagement feature 10 is connected to the second slanted section 8 of the adjacent engagement feature 11 at an obtuse angle. In other words, adjacently positioned first slanted section 6 and the second slanted section 8 are oriented at an obtuse angle thus delineating the connection point between the pair of engagement features 5 as the gripping edge 40 is profiled within the hollow section 7.

The present invention also incorporates an attachment feature which allows an external torque tool to attach to the torque-tool body 1 and increase the torque force applied to the damaged/stripped fastener 53. The attachment feature allows an external tool such as an open ended wrench, a box ended wrench, a combination wrench, an adjustable wrench, and a socket wrench to be attached to the torque-tool body 1.

Figure 5:
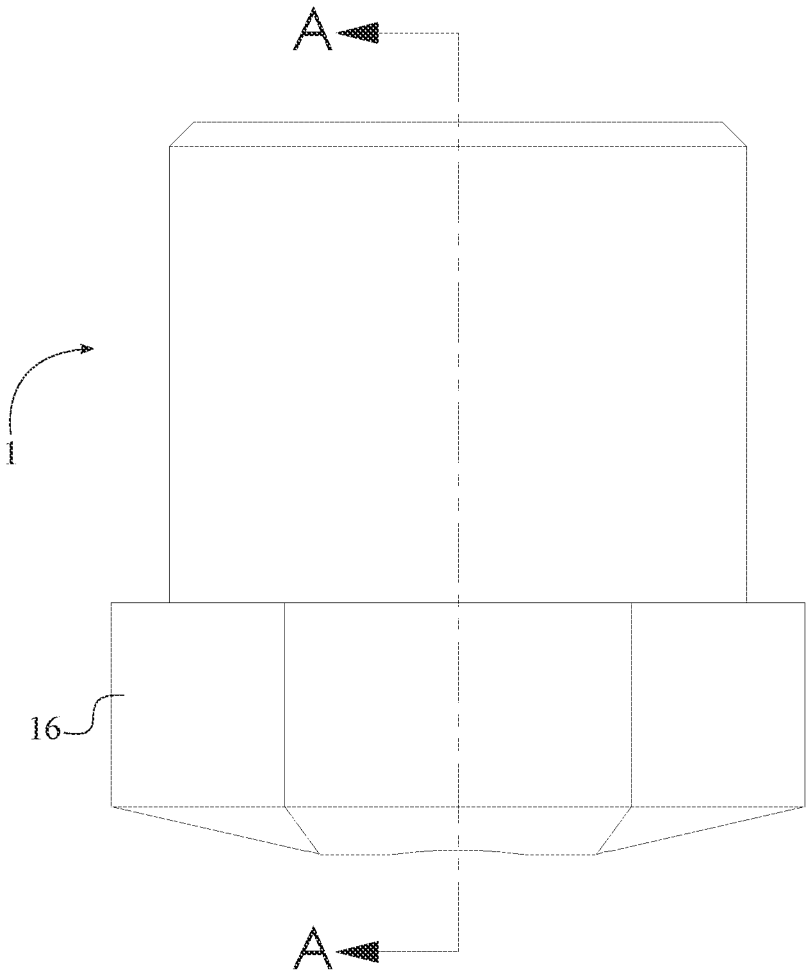
FIG. 5 is a side view of the torque-tool body of the present invention, showing the plane upon which a cross sectional view is taken shown in FIG. 6.

In reference to FIG. 5-6, some embodiment of the present invention further comprises an attachment body 16 and an engagement bore 17 as the attachment feature to allow an open ended wrench, a box ended wrench, a combination wrench, an adjustable wrench, and a socket wrench to be attached to the torque-tool body 1. The attachment body 16 is centrally positioned around and along the rotational axis 2 in order to align with the axis of rotation of the torque tool. Furthermore, the attachment body 16 is connected adjacent to the base 3 of the torque-tool body 1 and positioned opposite of the plurality of engagement features 5. The attachment body 16 is preferably of a hexagonal design with a diameter preferably and slightly larger than the diameter for the base 3 of the torque-tool body 1. However, the attachment body 16 may incorporate a smaller diameter than the base 3 depending on the base size and the preferred manufacturing method or design. The engagement bore 17 concentrically traverses through the attachment body 16 along the rotational axis 2. The engagement bore 17 is shaped to receive a male attachment member of a socket wrench, wherein the preferred shape of the engagement bore 17 is a square as the majority of socket wrenches utilize a square male attachment member. In alternative embodiments, the shape and design of the engagement bore 17 and the attachment body 16 may vary to be adaptable to different torque tools and different attachment means including, but not limited to, square or cylindrical. In an alternative embodiment, an outer surface of the attachment body 16 may have surface griping treatment applied such as knurling or other alternative methods that would increase the friction between torque-tool body 1 and any driven embodiments. In reference to FIG. 2 and FIG. 6, a bottom surface 31 of the attachment body 16 is tapered away from the engagement bore 17 so that the plurality of engagement features 5 can be driven into the damaged/stripped fasteners by a hammer, without hitting or damaging the engagement bore 17. In other words, a height of the attachment body 16 about the engagement bore 17 is slightly larger than a height of the attachment body 16 about the external surface of the attachment body 16 so that the bottom surface 31 can be tapered away from the engagement bore 17.

Figure 13:
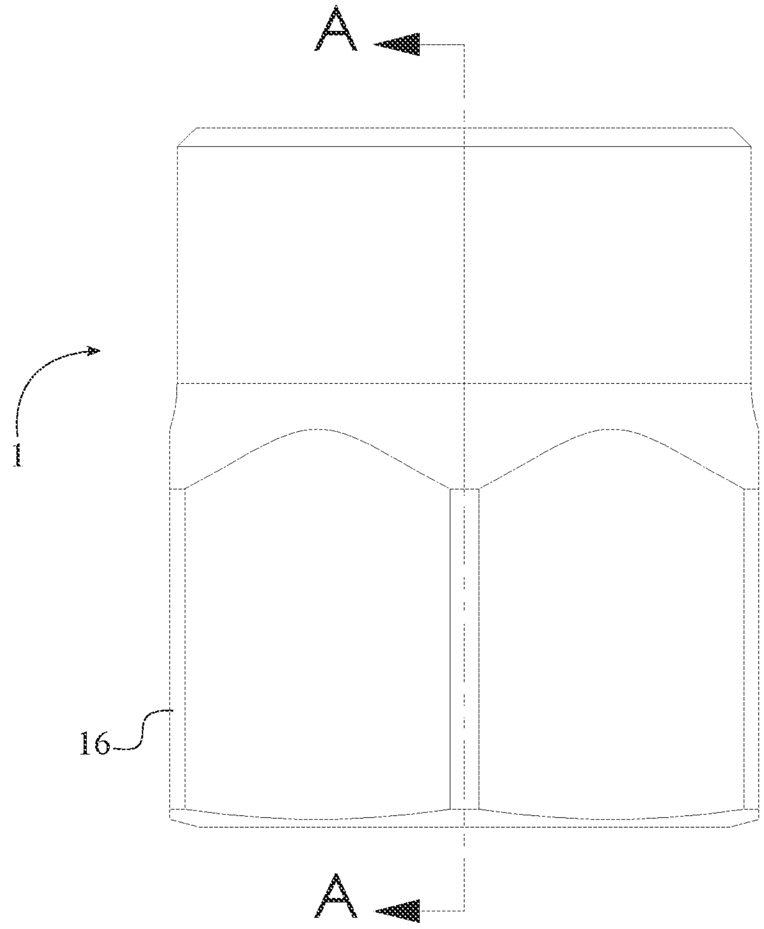
FIG. 13 is a side view of another embodiment of the torque-tool body of the present invention, showing the plane upon which a cross sectional view is taken shown in FIG. 13.
Figure 14:
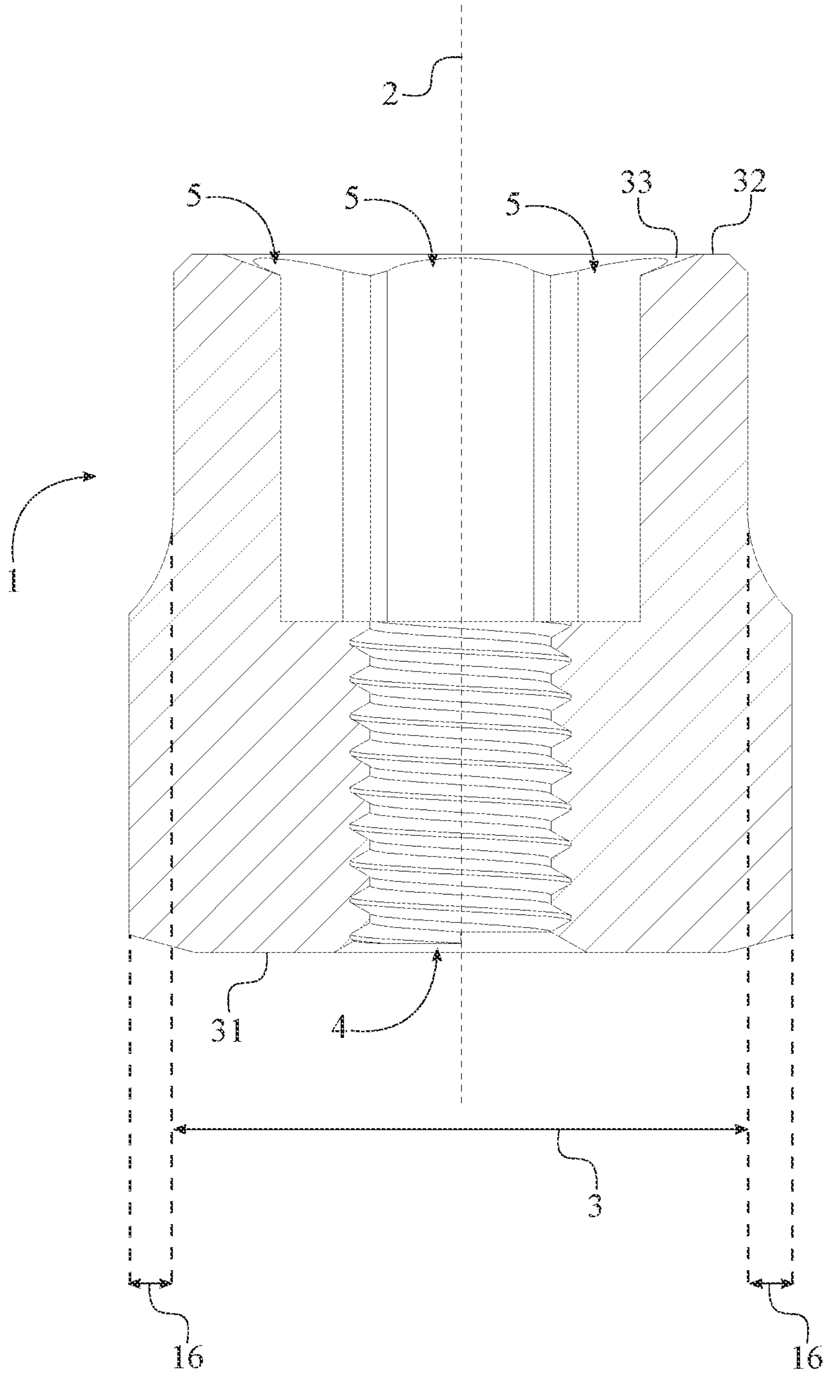
FIG. 14 is a cross section view of another embodiment of the torque-tool body of the present invention taken along line A-A of FIG. 13, showing the laterally connected attachment body.

In reference to FIG. 13-14, some embodiment of the present invention further comprises only the attachment body 16 as the attachment feature to allow an open ended wrench, a box ended wrench, a combination wrench, an adjustable wrench to be attached to the torque-tool body 1. The attachment body 16 is centrally positioned around and along the rotational axis 2 in order to align with the axis of rotation of the torque tool. Furthermore, the attachment body 16 is laterally connected around the base 3 of the torque-tool body 1 and the plurality of engagement features 5. Furthermore, a height 50 of the attachment body 16 is smaller than a total height 51 for the base 3 of the torque tool body 1 and the plurality of engagement features 5 as shown FIG. 19. The attachment body 16 is preferably of a hexagonal design with a diameter preferably and slightly larger than the diameter for the base 3 of the torque-tool body 1. However, in some alternative embodiments, the diameter of the attachment body 16 may be the same diameter of the base 3, or in further alternative embodiment of the present invention the diameter of the attachment body 16 may be less than a diameter of the base 3. In an alternative embodiment, an outer surface of the attachment body 16 may have surface griping treatment applied such as knurling or other alternative methods that would increase the friction between torque-tool body 1 and any driven embodiments. In the alternative embodiment as shown in FIGS. 13-14 the threaded opening 4 is incorporated through the attachment body 16.

Figure 7:
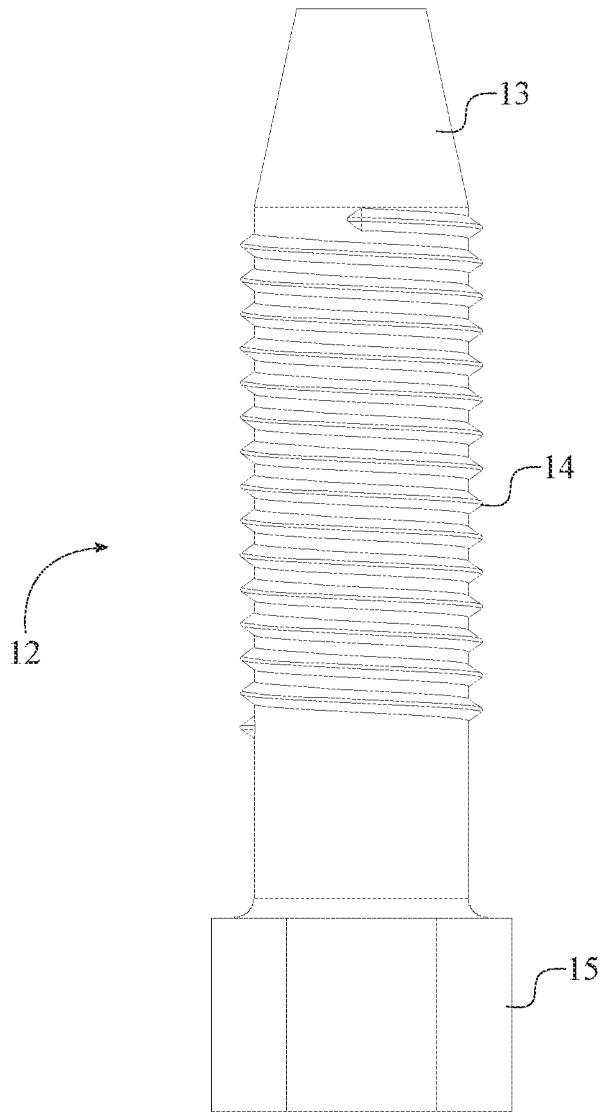
FIG. 7 is a side view of the release bolt of the present invention.

In reference to FIG. 7, the release bolt 12 that dislodges the damaged/stripped fastener 53 comprises a bottom section 13, a threaded shaft section 14, and a driver section 15. More specifically, the bottom section 13 and the driver section 15 are oppositely positioned of each other about the threaded shaft section 14, wherein the preferred embodiment of the threaded shaft section 14 is a circular body. The bottom section 13, threaded shaft section 14, and the driver section 15 are axially positioned with each other so that the bottom section 13 is concentrically connected to the threaded shaft section 14 from one end, and the driver section 15 is concentrically connected to the threaded shaft section 14 from the opposite end. The bottom section 13 is preferably a tapered conical body; however, the bottoms section 13 can be formed into any other shape as long as the bottom section 13 can easily be inserted through the threaded opening 4. Furthermore, a cavity can laterally traverse into the driver section 15 so that a torque applying handle can be engaged within the cavity to apply torque to the release bolt 12 when the release bolt 12 is engaged within the engagement bore 17. The cavity can be any profile including circular, square, or any other geometric profiles.

In reference to facilitate the engagement between the threaded opening 4 and the release bolt 12, the threaded shaft section 14 is designed to match the respective threads of the threaded opening 4 as shown in FIG. 8. When the damaged/stripped fastener 53 needs to be dislodged, the threaded shaft section 14 is engaged with the threaded opening 4. Resultantly, a base surface of the bottom section 13 is positioned adjacent and within the plurality of engagement features 5, as the driver section 15 is positioned offset of the torque-tool body 1. The user is able to apply the appropriate clockwise or counterclockwise torque to the release bolt 12 via the driver section 15, translating the rotational forces into linear forces until the damaged/stripped fastener 53 is released from the socket. Due to the internal positioning of the base surface of the bottom section 13 within the plurality of engagement features 5, the base surface of the bottom section 13 comes into contact and dislodges the damaged/stripped fastener 53 through the applied linear force. In the preferred embodiment of the driver section 15 is a hexagonal shape. However, in alternative embodiments, shapes of the driver section 15 can include, but is not limited to square, round, or internal drives which may be adapted to a different socket wrench or any other similar tool that can apply rotational force. The bottom section 13 may be shaped into cylindrical profile, a square profile, a hexagonal profile, or any other profile preferred by the user or the manufacturer. The threaded shaft section 14 may be any shaped shank including, but not limited to, a semi-round, a semi-square, or any other geometric shaped shank to which a male thread may be applied.

In order for the base surface of the bottom 13 to reach the damaged/stripped fastener 53, a length 60 of the release bolt 12 along the rotational axis 2 is preferably greater than a length 61 of the torque-tool body 1 along the rotational axis 2 as shown in FIG. 8. However, an alternating embodiment of the present invention, the length 60 of the release bolt 12 along the rotational axis 2 can be equal or less than the length 61 of the torque-tool body 1 along the rotational axis 2, wherein a diameter of the driver section 15 is equal or less than a diameter of the threaded shaft section 14 along with an internal driver-profile within the driver section 15.

Figure 15:
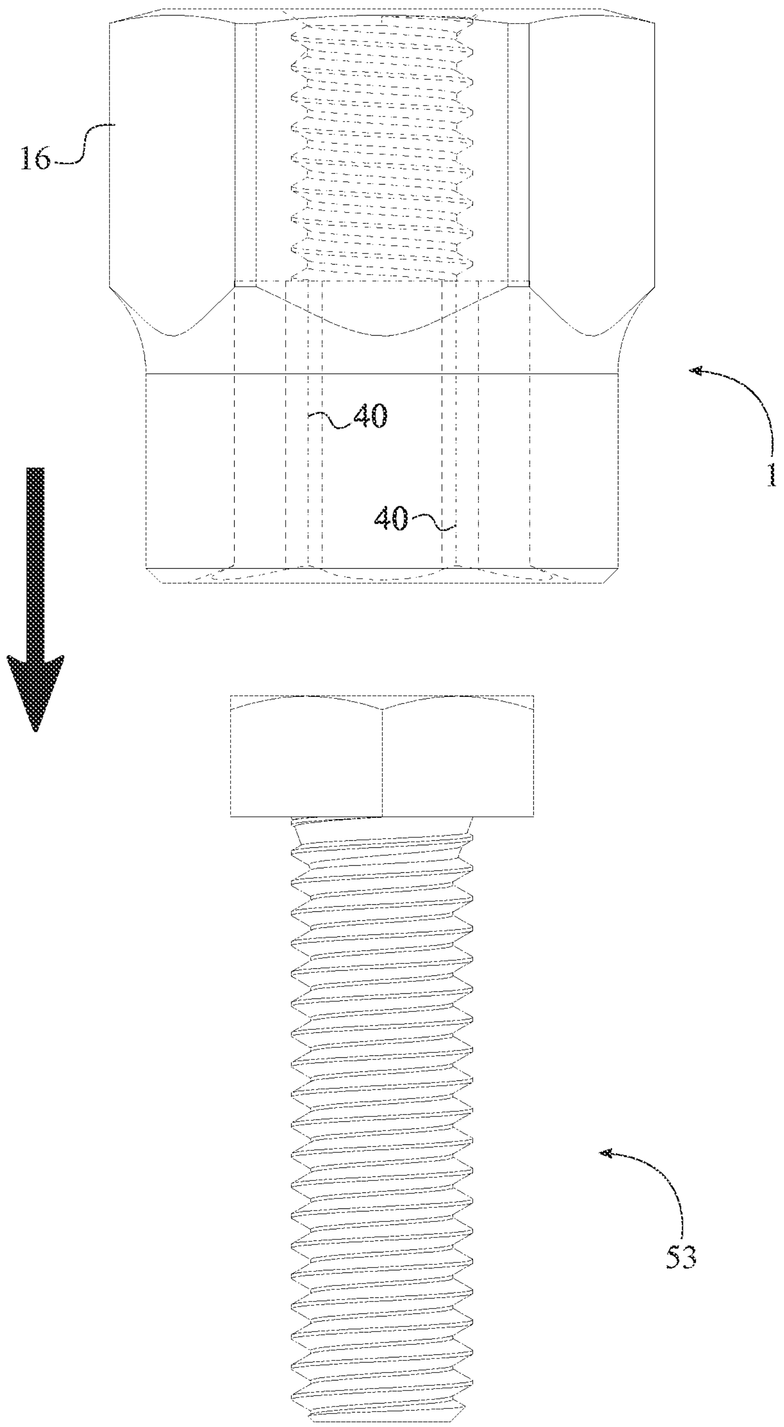
FIG. 15 is a side view of the present invention before pushing around the damaged/stripped fastener.
Figure 16:
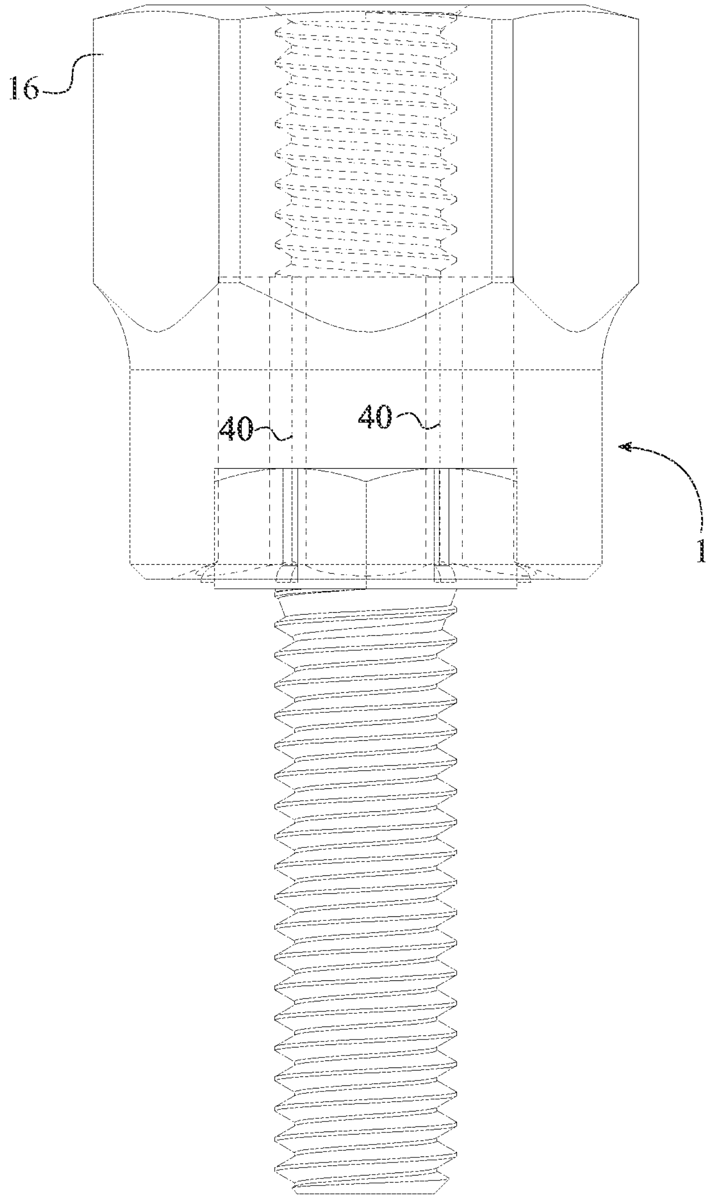
FIG. 16 is a side view of the present invention being engaged around the damaged/stripped fastener, wherein each gripping edge cuts a channel into the damaged/stripped fastener.
Figure 17:
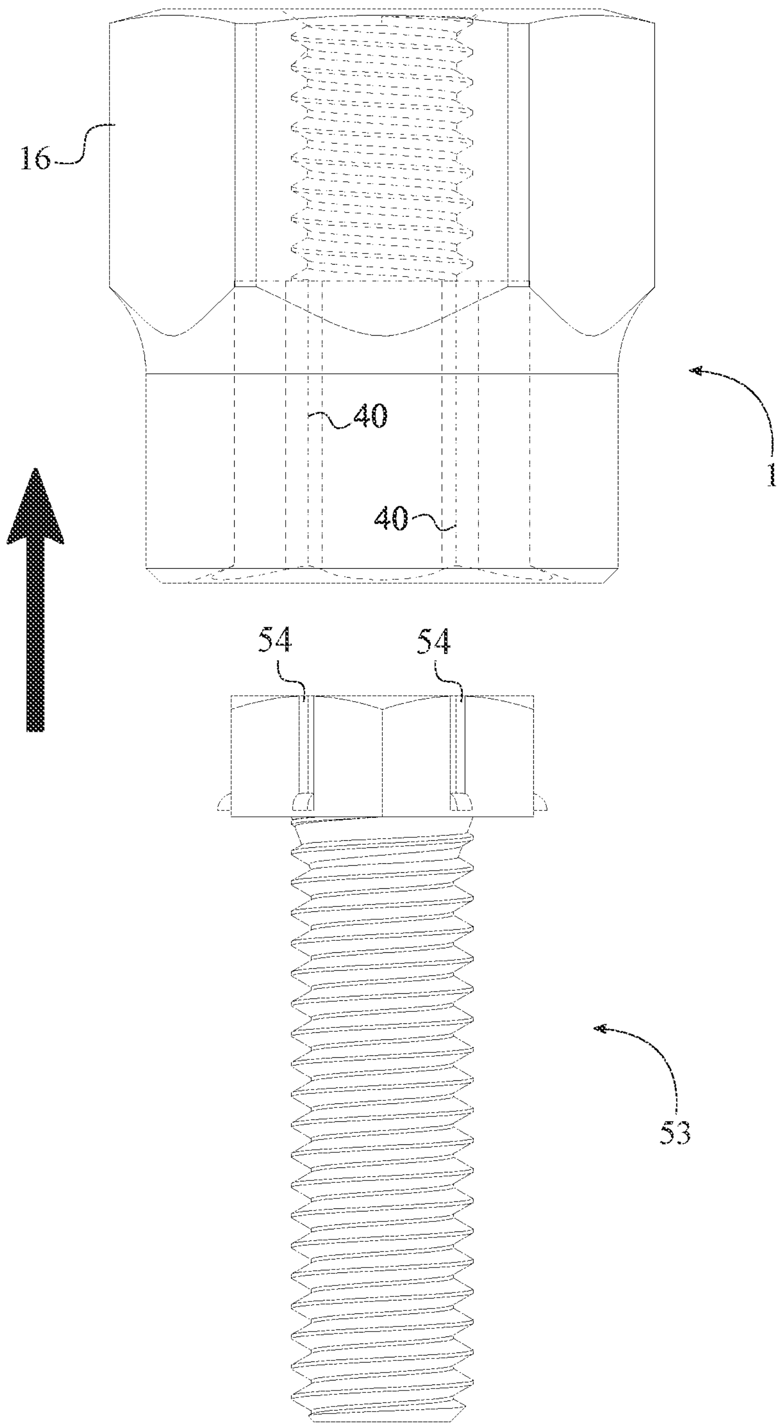
FIG. 17 is a side view of the present invention being removed from the damaged/stripped fastener and showing the channel of the damaged/stripped fastener.
Figure 21:
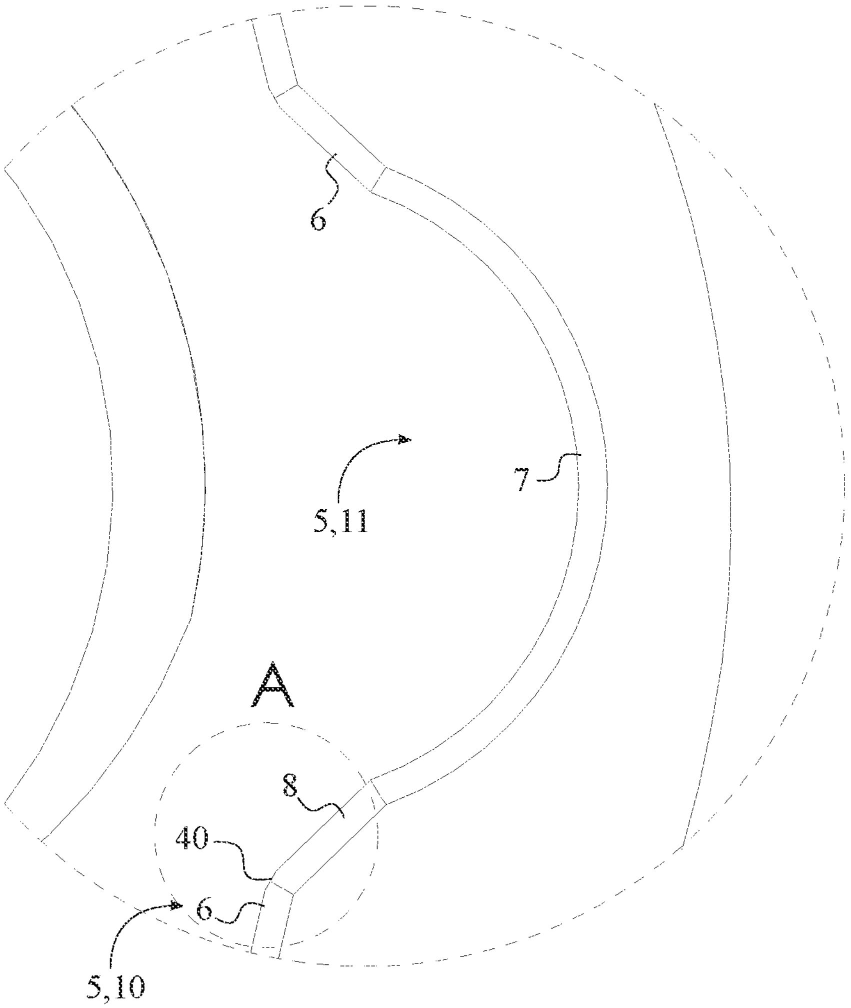
FIG. 21 is a detailed view for the plurality of engagement features of the present invention taken within section line A, showing the gripping edge.
Figure 22:
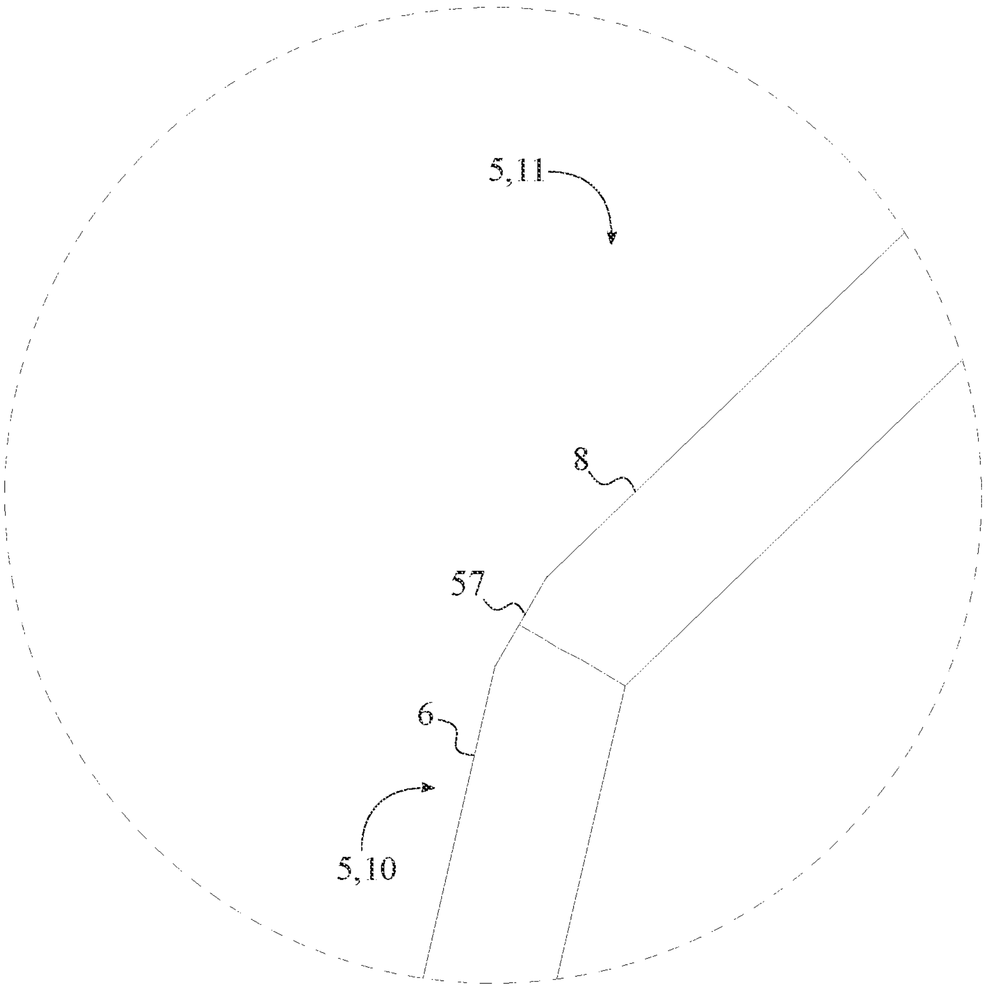
FIG. 22 is a detailed view for the plurality of engagement features of the present invention taken within section line A, showing the gripping edge being a sharp flat-edge.
Figure 23:
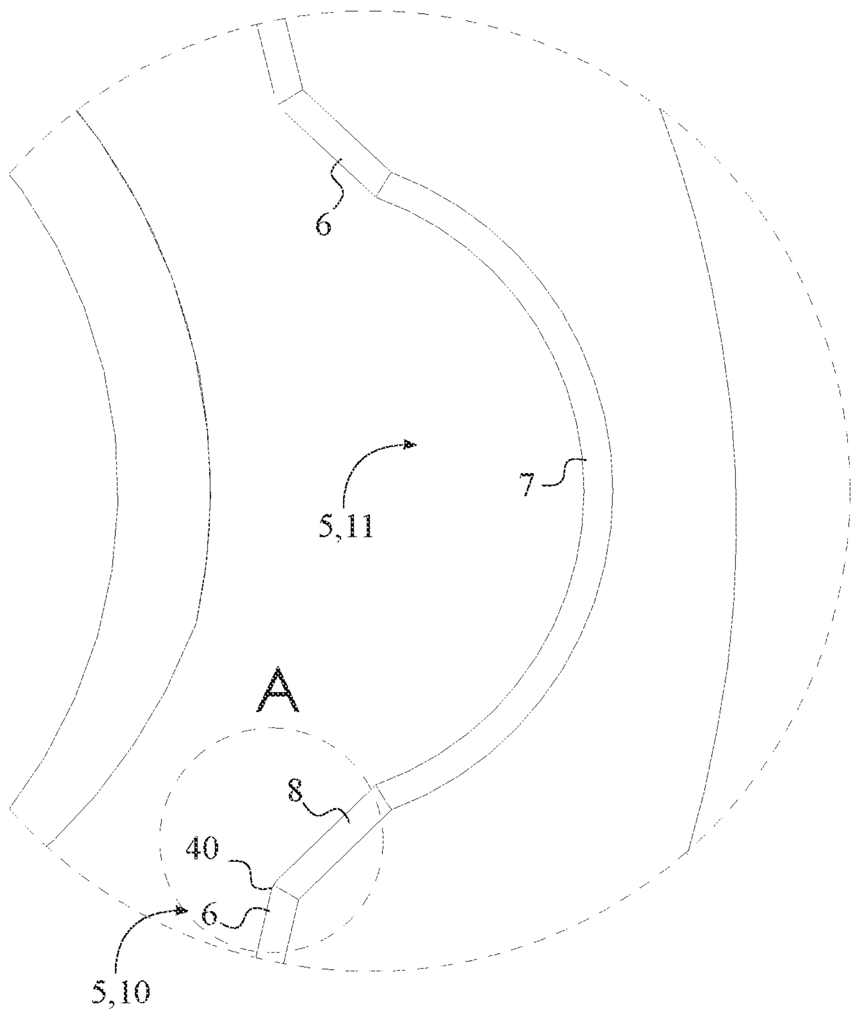
FIG. 23 is a detailed view for the plurality of engagement features of the present invention taken within section line A, showing the gripping edge.
Figure 24:
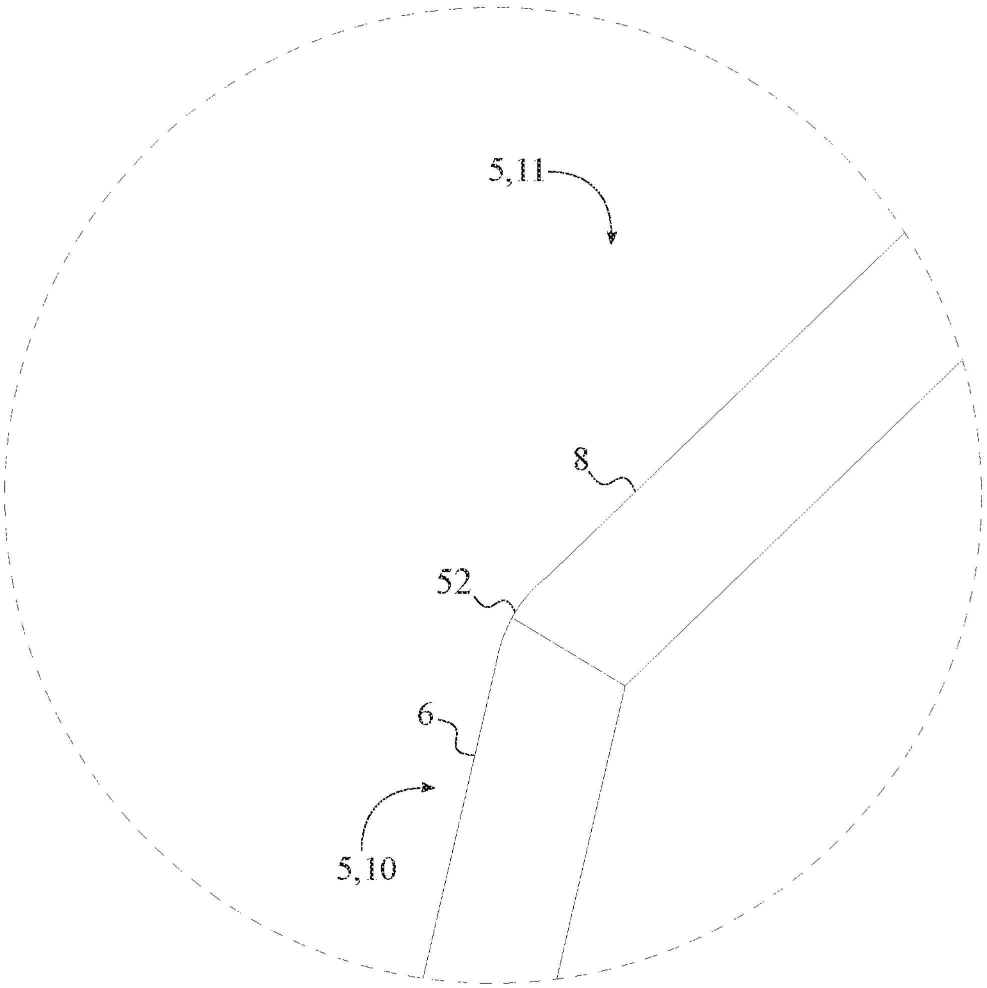
FIG. 24 is a detailed view for the plurality of engagement features of the present invention taken within section line A, showing the gripping edge being a sharp convex section.

The functionality of the gripping edge 40 with respect to the preferred embodiment, the first alternative embodiment, and the second alternative embodiment remains consistent so that the present invention is able to firmly grip around the fastener head or the threaded shaft. More specifically, the gripping edge 40 can preferably be a sharp flat-edge as shown in FIG. 21-22 or a sharp convex section as shown in FIG. 23-24. However, the gripping edge 40 may be configured into a sharp point or concave portion if preferred by the manufacturer. Furthermore, the gripping edge 40 may be configured with the manufacturing radius. One of the unique features of the gripping edge 40 is the ability to cut, push and peel subject material away to create a groove or channel 54 into the damaged/stripped fastener 53 as shown in FIG. 15-17. As a result, each gripping edge 40 is able securely clamp the present invention to the fastener head or the threaded shaft, thereby creating a greatly enhanced engagement. The groove or channel 54 is created parallel to the rotational axis 2, and perpendicular to the top surface 35 of the base 3. Additionally, each gripping edge 40 enables the present invention to function equally effectively in both clockwise and counterclockwise directions. Furthermore, because each gripping edge 40 is an acute point that cuts and engages with the fastener head or the threaded shaft, the possibility of slippage of the present invention is eliminated, whereas existing spiral engagement extractor tools invite slippage due to the spiral engagement features being orientated in the same rotational direction as the torque force being applied to facilitate extracting process. Likewise, a traditional socket extracting tools that applies rotational force to the lateral walls of the fastener head is prone to slipping or damaging a fastener. The present invention is effective at engaging and applying rotational torque force to the fastener head or the threaded shaft without slipping by way of cutting grooves or channels 54 to the subject to be rotated. Once the groove or channel 54 is cut into the fastener head or the threaded shaft via the gripping edge 40, the dislodge material from the fastener head or the threaded shaft collects adjacent to the first slanted section 6, and a second slanted section 8 and the top chamfered surface 33 thus providing additional contact surface area between the present invention and the damaged/stripped fastener 53. As a result, the user is able to apply greater torque to the damaged/stripped fastener 53.

Figure 18:
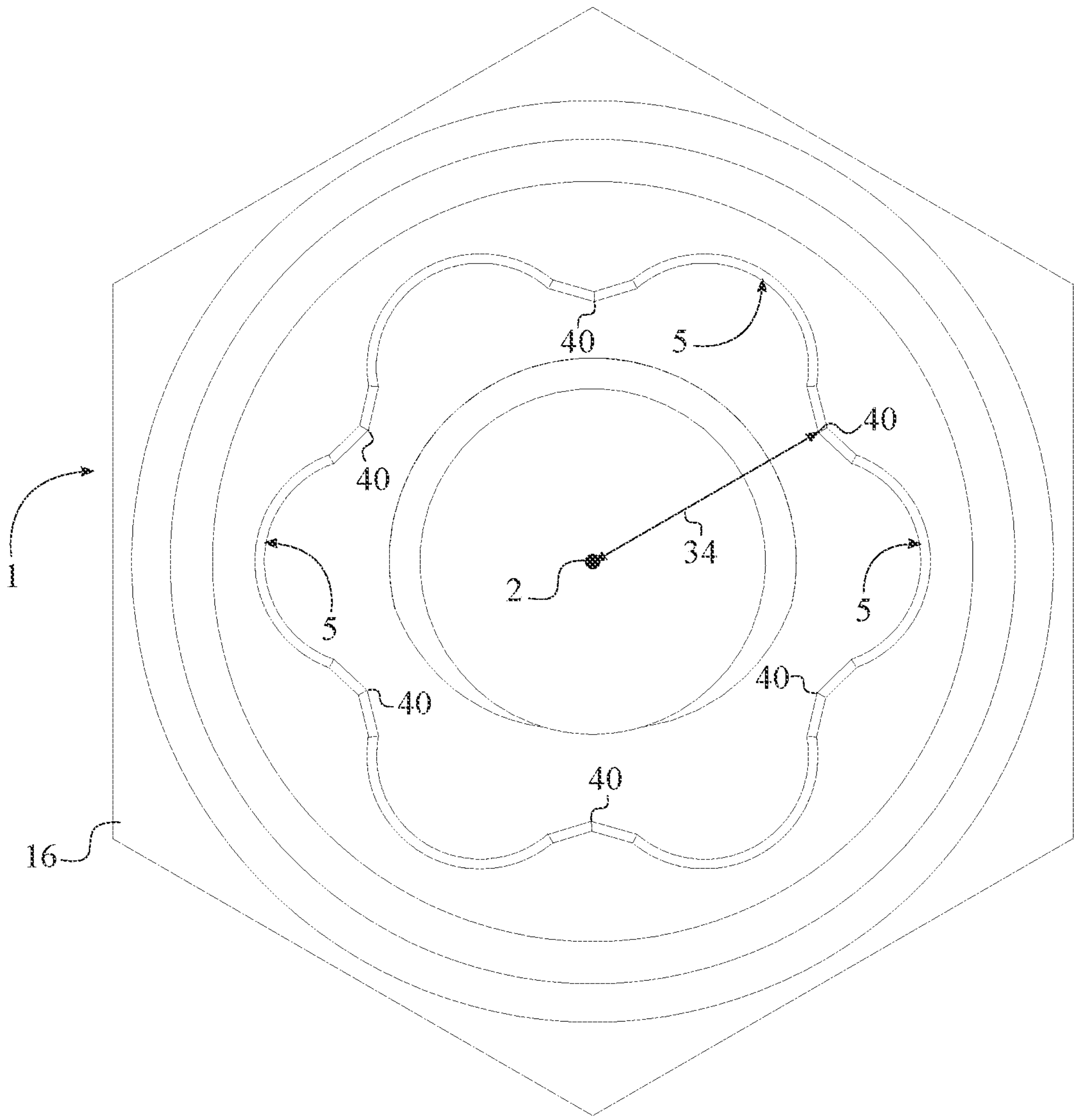
FIG. 18 is a top view of the torque-tool body and the plurality of engagement features of the present invention, showing the channel cutting radius.

In reference to FIG. 18, the present invention further comprises a channel cutting radius 34 that is delineated from the rotational axis 2 to the gripping edge 40. More specifically, the channel cutting radius 34 is less than a radius of the fastener head or the threaded shaft by approximately 1-5%. Preferably, the channel cutting radius 34 is less than a radius of the fastener head or the threaded shaft by approximately 1-3%.

Furthermore, the griping edge 40 engages about the center of the lateral wall of a conventional male hexagonal fastener head as shown in FIG. 17. As a result, even after the present invention has cut a groove or channel 54 in the lateral wall of the conventional male hexagonal fastener, the use of a conventional wrench or socket is not compromised. For example, even after the present invention is used to extract a traditional Hex fastener, a typical socket or wrench may be used to apply torque to the fastener as the damage caused by the socket extractor is minimal and does not interfere with the fastener driving surface used by a standard tools. Additionally, the present invention is able to be used on a threaded shaft without causing damage beyond the use of a nut after extraction. In other words, when the present invention is used to cut a groove or channel 54 on the surface of a threaded shaft, a threaded nut may be used to fasten as required since the damage caused by the present invention is not prohibitive to the helical engagement of the threaded shaft and the threaded nut.

During engagement and the application of rotational torque to the fastener head or the threaded shaft, the first slanted section 6 and the second slanted section 8 are angularly orientated with the lateral wall of the fastener head or radial surface of the threaded shaft. As a result, the first slanted section 6 and the second slanted section 8 are preferably symmetrical to the lateral wall of the fastener head or radial surface of the threaded shaft. In other words, the first slanted section 6 and the second slanted section 8 are offset and not parallel with the subject planar surface. The angular degrees offset with the fastener head or the threaded shaft are preferably all equal; however, the first slanted section 6 and the second slanted section 8 are not limited to this option.

Each gripping edge 40 is symmetrically arranged and equally distanced circumferentially in a vertical direction along the rotational axis as shown in FIG. 3. In other words, the first slanted section 6 and the second slanted section 8 are non-tapered from the top surface 35 of the base 3 to the top flat surface 32. This feature greatly improves the present invention because there is an equal transfer of torque force to the fastener head or the threaded shaft along the total height of the plurality of engagement features 5 thus preventing the present invention from slipping off the fastener. It is well known by those in the knowledge of art that a tapered torque tool is subjected to slipping off the fastener head or the threaded shaft because the engagement between the tapered extractor tool and the fastener head or the threaded shaft is not equally distributed along the entire height of the plurality of engagement features 5.

Figure 19:
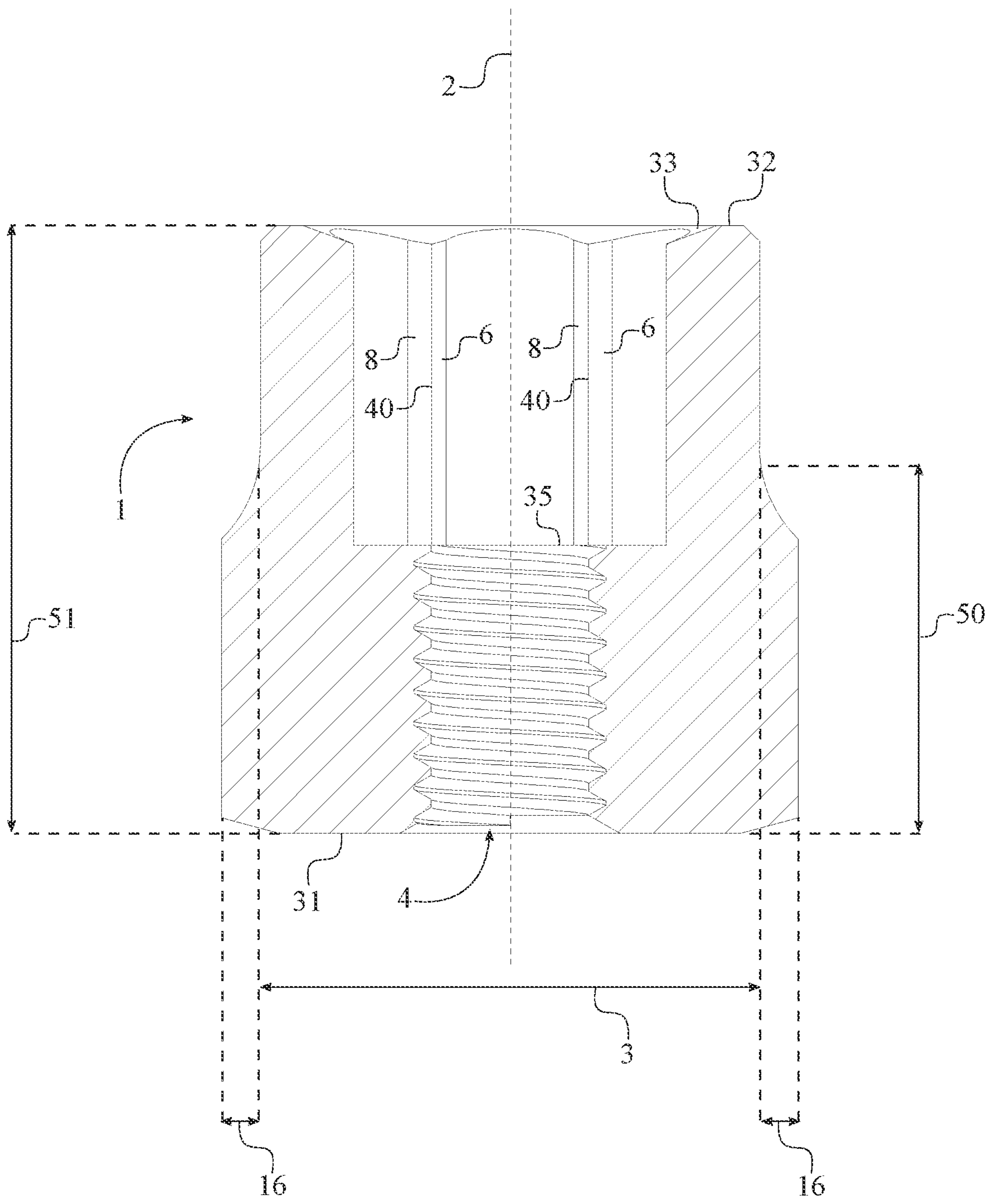
FIG. 19 is a side view of the torque-tool body and the plurality of engagement features of the present invention, showing a smaller height the attachment body in comparison to the larger combine height of the torque-tool body and the plurality of engagement features.

The first slanted section 6 and the second slanted section 8 are straight and perpendicular to the top surface 35 of the base 3 as shown in FIG. 19. Furthermore, each gripping edge 40 of the arbitrary engagement feature 10 and the adjacent engagement feature 11 is positioned parallel to the rotational axis 2. In other words, the first slanted section 6, the second slanted section 8, and each gripping edge 40 are vertical in a direction from the top surface 35 of the base 3 to the top chamfered surface 33.

To remove the damaged/stripped fastener 53 with the present invention, the torque-tool body 1 is positioned around the damaged/stripped fastener 53 so that a significant portion of the plurality of engagement features 5 are positioned around the fastener head or the threaded shaft. In other words, the user needs to press or drive the plurality of engagement features 5 onto the fastener head or the threaded shaft using percussion blows so that each gripping edge 40 can cut into the fastener head or the threaded shaft. The user then simply applies a counter-clockwise torque force to the torque-tool body 1 in order to rotate and remove the damaged/stripped fastener 53. When a torque force is applied to the torque-tool body 1, the plurality of engagement features 5 "bite" into the lateral walls of fastener head which in turn rotates the fastener. The present invention is designed to engage partially or fully stripped fastener heads. The present invention overcomes slippage of the fastener head through the use of the plurality of engagement features 5 since each pair of the plurality of engagement features 5 delineates the gripping edge 40.

Figure 20:
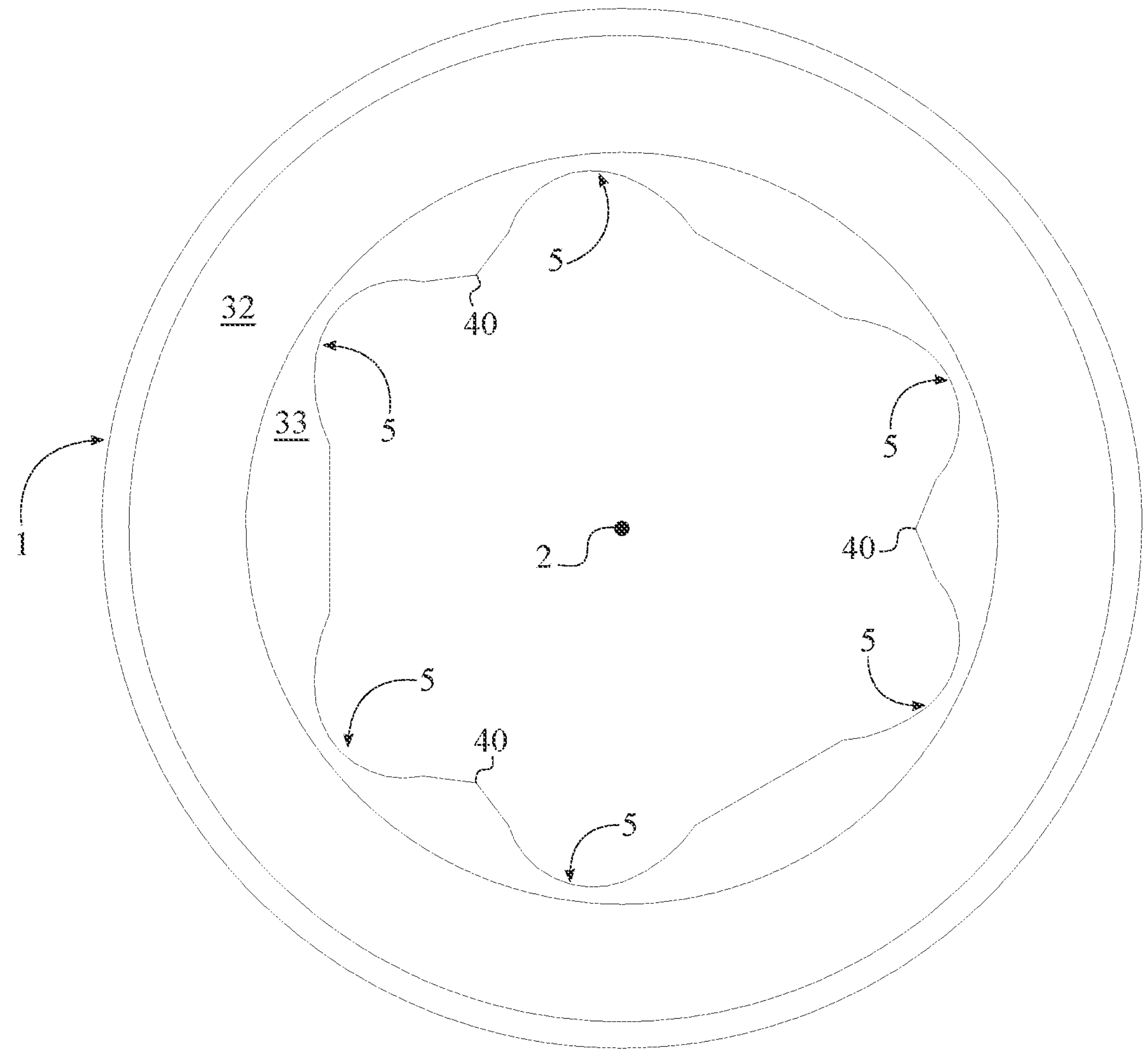
FIG. 20 is a top view of another embodiment of the torque-tool body and the plurality of engagement features of the present invention with the intermediate sidewall portion.

The present invention may further incorporate an intermediate sidewall portion in between a first adjacent pair of the plurality of engagement features 5 and a second adjacent pair of the plurality of engagement features 5 as shown in FIG. 20. In other words, a corresponding engagement feature adjacent to a pair of plurality of engagement features 5 is replaced by the intermediate sidewall portion that can be a straight, radial, flat lateral surface sidewall or any other shape as preferred by the user.

Figure 25:
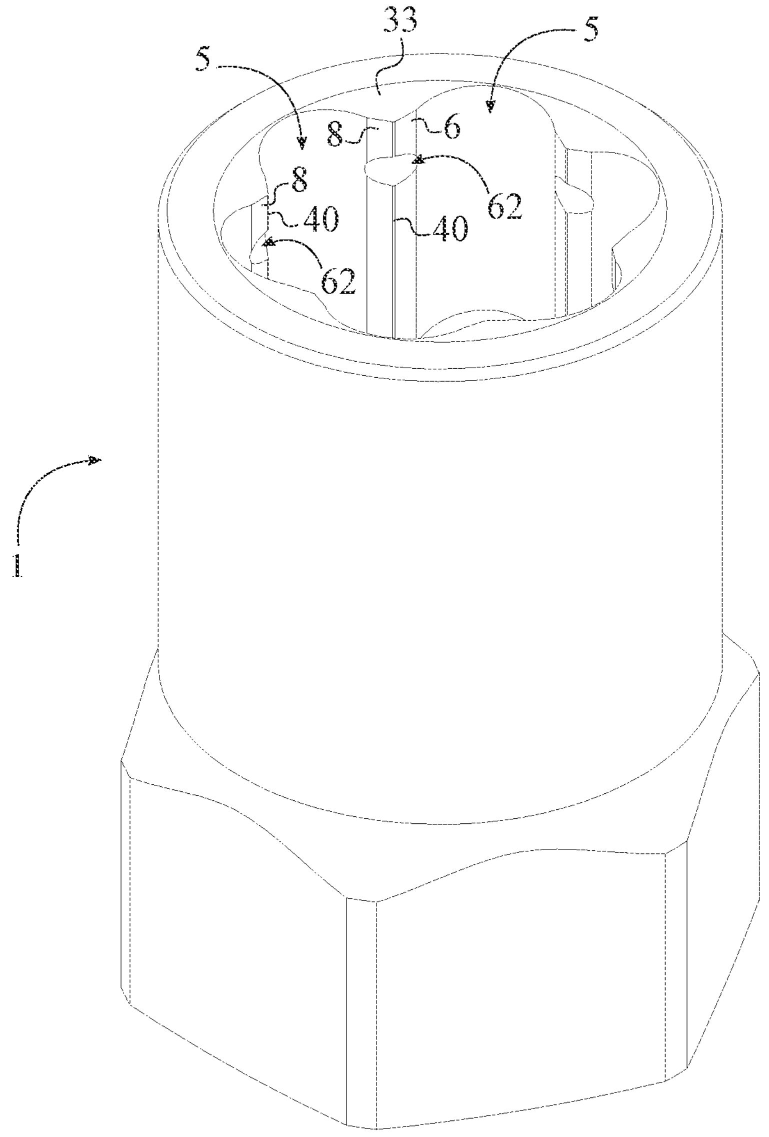
FIG. 25 is a perspective view of the present invention, showing the plurality of engagement-feature clean-out grooves about the gripping edges.

In reference to FIG. 25, the present invention further comprises a plurality of engagement-feature clean-out grooves 62. Each of the plurality of engagement-feature clean-out grooves 62 is centrally positioned to the gripping edge 40 and traverses into the torque-tool body 1. Furthermore, each of the plurality of engagement-feature clean-out grooves 62 is positioned adjacent and offset from the top chamfered surface 33. More specifically, each of the plurality of engagement-feature clean-out grooves 62 traverses into the torque-tool body 1 about the gripping edge 40 and extends from the first slanted section 6 to the second slanted section 8 of the pair of engagement features 5. Each engagement-feature clean-out grooves 62 is provided to assist in the removal of fastener material and reduce friction between fastener 53 and the torque-tool body 1 during the pressing process of the present invention on to the fastener 53 to be removed. Each engagement-feature clean-out grooves 62 may be a singular groove or a plurality of grooves, and may be placed on one or more engagement features 5, or every engagement feature of the engagement features 5 of the present invention. Each engagement-feature clean-out grooves 62 may be any shape including, but not limited to, at least one groove, a plurality of circular shaped grooves, a plurality of angular shaped grooves, or combination of thereof. Preferably, each engagement-feature clean-out grooves 62 has sharp edges that are able to cut or scrape fastener material. Each engagement-feature clean-out grooves 62 may be placed in any location between the top flat surface 32 and the top surface 35 of the base 3 and about the gripping edge 40.

Although the invention has been explained in relation to its preferred embodiment, it is to be understood that many other possible modifications and variations can be made without departing from the spirit and scope of the invention as hereinafter claimed.

What is claimed is:

1. A fastener extractor and dislodging tool apparatus comprising:
- a torque-tool body;
- a plurality of engagement features;
- a gripping edge;
- a threaded opening;
- a release bolt;
- the plurality of engagement features being radially positioned around a rotational axis of the torque-tool body;
- the plurality of engagement features being perimetrically connected around a base of the torque-tool body;
- a cross section for each of the plurality of engagement features comprising a first slanted section, a hollow section, and a second slanted section;
- the first slanted section being terminally connected to the hollow section;
- the second slanted section being terminally connected to the hollow section;
- the first slanted section and the second slanted section being oppositely positioned of each other about the hollow section;
- the plurality of engagement features comprising an arbitrary engagement feature, an adjacent engagement feature, and an opposite engagement feature;
- the opposite engagement feature being positioned opposite to the adjacent engagement feature across the arbitrary engagement feature;
- the first slanted section of the arbitrary engagement feature being connected to the second slanted section of the adjacent engagement feature at the gripping edge;
- the second slanted section of the adjacent engagement feature being angularly offset from the first slanted section of the opposite engagement feature;
- the gripping edge being configured to cut a channel into a fastener parallel with the rotational axis of the torque-tool body;
- the threaded opening concentrically traversing through the base;

the release bolt comprising a bottom section, a threaded shaft section, and a driver section;

the release bolt being integrally formed;

the release bolt being threadedly engaged with the threaded opening, opposite of the plurality of engagement features;

the bottom section and the driver section being oppositely positioned of each other about the threaded shaft section;

the bottom section being concentrically connected to the threaded shaft section;

the driver section being concentrically connected to the threaded shaft section;

the threaded shaft section being engaged with the threaded opening; and the bottom section being positioned adjacent to the plurality of engagement features.

2. The fastener extractor and dislodging tool apparatus as claimed in claim 1, wherein the torque-tool body is outwardly extended from a cross section of the plurality of engagement features.

3. The fastener extractor and dislodging tool apparatus as claimed in claim 1, wherein the first slanted section of the arbitrary engagement feature is connected to the second slanted section of the adjacent engagement feature at an obtuse angle.

4. The fastener extractor and dislodging tool apparatus as claimed in claim 1 comprising:

an attachment body;

an engagement bore;

the attachment body being centrally positioned around and along the rotational axis;

the attachment body being adjacently connected to the base of the torque-tool body, opposite of the plurality of engagement features; and the engagement bore concentrically traversing through the attachment body along the rotational axis.

5. The fastener extractor and dislodging tool apparatus as claimed in claim 1 comprising:

an attachment body;

the attachment body being centrally positioned around and along the rotational axis;

the attachment body being laterally connected around the base of the torque tool body and the plurality of engagement features; and a height of the attachment body being smaller than a total heigh for the base of the torque tool body and the plurality of engagement features.

6. The fastener extractor and dislodging tool apparatus as claimed in claim 1 comprising:

a channel cutting radius; and the channel cutting radius being delineated from the rotational axis to the gripping edge.

7. The fastener extractor and dislodging tool apparatus as claimed in claim 1 comprising:

a top flat surface;

a top chamfered surface;

the top flat surface and the top chamfered surface being radially delineated by the plurality of engagement features;

the top flat surface being perimetrically connected around the top chamfered surface;

the top flat surface being positioned parallel to a top surface of the base;

the top chamfered surface being angularly positioned to the top flat surface; and the top chamfered surface being oriented towards the top surface of the base.

8. The fastener extractor and dislodging tool apparatus as claimed in claim 7 comprising:

the top chamfered surface comprising a plurality of angular portions;

the plurality of angular portions being radially positioned within the top flat surface; and each of the plurality of angular portions being centrally positioned to the gripping edge.

9. The fastener extractor and dislodging tool apparatus as claimed in claim 1 comprising:

the hollow section being delineated into an empty space; and the empty space being configured to be positioned offset from a fastener.

10. The fastener extractor and dislodging tool apparatus as claimed in claim 1, wherein the gripping edge is a chamfered edge configured to cut the channel into the fastener parallel with the rotational axis of the torque-tool body.

11. The fastener extractor and dislodging tool apparatus as claimed in claim 1, wherein the gripping edge is a sharp convex section configured to cut the channel into the fastener parallel with the rotational axis of the torque-tool body.

12. The fastener extractor and dislodging tool apparatus as claimed in claim 1 comprising:

a plurality of engagement-feature clean-out grooves;

each of the plurality of engagement-feature clean-out grooves being centrally positioned to the gripping edge;

each of the plurality of engagement-feature clean-out grooves traversing into the torque-tool body; and each of the plurality of engagement-feature clean-out grooves being positioned adjacent and offset from the top chamfered surface.

13. The fastener extractor and dislodging tool apparatus as claimed in claim 1 comprising:

the driver section being positioned offset of the torque-tool body; and a length of the release bolt along the rotational axis being greater than a length of the torque-tool body along the rotational axis.

* * * * *